US009245015B2

(12) United States Patent
Misra et al.

(10) Patent No.: US 9,245,015 B2
(45) Date of Patent: Jan. 26, 2016

(54) ENTITY DISAMBIGUATION IN NATURAL LANGUAGE TEXT

(71) Applicant: Accenture Global Services Limited, Dublin (IE)

(72) Inventors: Janardan Misra, Pithoragarh (IN); Subhabrata Das, Kolkata (IN)

(73) Assignee: Accenture Global Services Limited, Dublin (IE)

( * ) Notice: Subject to any disclaimer, the term of this patent is extended or adjusted under 35 U.S.C. 154(b) by 321 days.

(21) Appl. No.: 13/790,864

(22) Filed: Mar. 8, 2013

(65) Prior Publication Data

US 2014/0258301 A1 Sep. 11, 2014

(51) Int. Cl.
*G06F 17/30* (2006.01)
*G06F 17/27* (2006.01)

(52) U.S. Cl.
CPC ...... *G06F 17/30731* (2013.01); *G06F 17/2785* (2013.01)

(58) Field of Classification Search
CPC .......... G06F 17/30705; G06F 17/277
See application file for complete search history.

(56) References Cited

U.S. PATENT DOCUMENTS

| | | | | |
|---|---|---|---|---|
| 2008/0104071 | A1* | 5/2008 | Pragada et al. | 707/6 |
| 2010/0131563 | A1* | 5/2010 | Yin | 707/794 |
| 2010/0131569 | A1* | 5/2010 | Jamison et al. | 707/803 |
| 2010/0313258 | A1* | 12/2010 | Chaudhuri et al. | 726/9 |
| 2013/0159348 | A1* | 6/2013 | Mills et al. | 707/777 |
| 2014/0067832 | A1* | 3/2014 | Lamba et al. | 707/750 |

OTHER PUBLICATIONS

Talburt, J. R., "Entity Resolution and Information Quality", Morgan Kaufmann, 2011, 235 pages.
Christen, P., "Data Matching: Concepts and Techniques for Record Linkage, Entity Resolution, and Duplicate Detection", Springer, 2012, 270 pages.
Agirre, E. et al., "Word Sense Disambiguation: Algorithms and Applications", Text, Speech and Language Technology, 1st Edition, vol. 33, Springer, 2007, 366 pages.
Verma et al., "Requirements Analysis Tool: A Tool for Automatically Analyzing Software Requirements Documents", The Semantic Web-ISWC 2008, 2008, pp. 751-763.
Princeton University, "WordNet—A Lexical Database for English", Apr. 27, 2012, 2 pages.
CRC Press LLC, "Algorithms and Theory of Computation Handbook—Levenshtein distance", in Dictionary of Algorithms and Data Structures, Aug. 14, 2008, 2 pages.

(Continued)

*Primary Examiner* — Mohammad S Rostami
(74) *Attorney, Agent, or Firm* — Harrity & Harrity, LLP

(57) ABSTRACT

A device analyzes first text to identify a pair of terms, within the first text, that are alias terms. The device analyzes the first text by performing two or more of: a latent semantic analysis of the pair of terms, based on the pair of terms being associated with a particular tag; a tag-based analysis that determines that the pair of terms are associated with compatible tags; a transitive analysis that determines that a pair of neighbor terms, associated with the pair of terms, are associated with compatible tags; or a co-location analysis based on a distance between the pair of terms in the first text. The device generates, based on analyzing the first text, a glossary that includes the pair of terms identified as alias terms. The device replaces terms within the first text or a second text that is different from the first text, using the glossary.

26 Claims, 17 Drawing Sheets

(56) References Cited

OTHER PUBLICATIONS

Hill et al., "AMAP: Automatically Mining Abbreviation Expansions in Programs to Enhance Software Maintenance Tools", MSR'08, May 2008, 10 pages.

Kuhn et al., "Semantic Clustering: Identifying Topics in Source Code", Appears in Information and Software Technology—INFSOF, vol. 49, No. 3, Jun. 29, 2006, 30 pages.

The Apache Software Foundation, "OpenNLP—Welcome to Apache OpenNPL", 2010, 1 page.

U.S. Environmental Protection Agency, "Appendix E: Sample Functional Requirements Document for Web Sites Including Information About Brownfields Properties", Jan. 31, 2012, 15 pages.

Maynard et al., "NLP Techniques for Term Extraction and Ontology Population", Proceedings of the 2008 conference on Ontology Learning and Population: Bridging the Gap between Text and Knowledge, 2008, 21 pages.

Schaeffer, "Graph Clustering", Computer Science Review I, 2007, pp. 27-64.

Oates et al., "Using Latent Semantic Analysis to Find Different Names for the Same Entity in Free Text", $4^{th}$ International Workshop on Web Information and Data Management, vol. 8, Nov. 8, 2002, 5 pages.

Navigli, "Word Sense Disambiguation: A Survey", ACM Computing Surveys, vol. 41, No. 2, Article 10, Feb. 2009, 69 pages.

Yin et al., "User Name Alias Extraction in Emails", I.J Image Graphics and Signal Processing, Apr. 2011, 9 pages.

Anwar et al., "Web Content Mining for Alias Identification: a first step towards suspect tracking", Proceedings of the $9^{th}$ International Conference on Intelligence and Security Informatics (ISI'11), Jul. 2011, 3 pages.

Bollegala et al., "Mining for Personal Name Aliases on the Web", WWW 2008/Poster Paper, Apr. 21-25, 2008, 2 pages.

Jiang et al., "Towards Alias Detection Without String Similarity: an Active Learning Based Approach", SIGIR, Aug. 12-16, 2012, 2 pages.

Fan et al., "On Graph-Based Name Disambiguation", ACM, Feb. 1, 2011, 23 pages.

\* cited by examiner

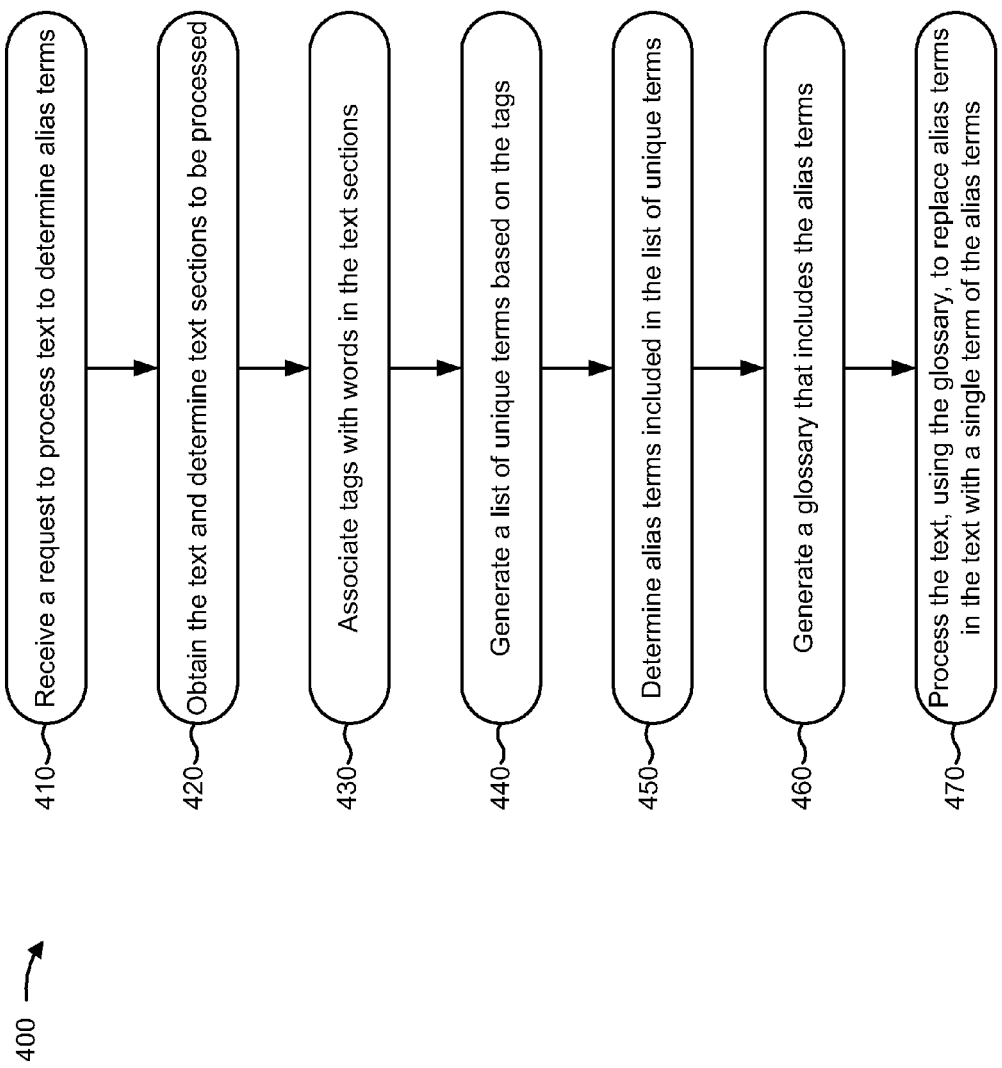

ENTITY DISAMBIGUATION IN NATURAL LANGUAGE TEXT

BACKGROUND

Text documents may include inconsistent term usage, such as different terms that represent the same concept. Such inconsistencies can make comprehension of text documents difficult.

BRIEF DESCRIPTION OF THE DRAWINGS

FIG. 4 is a flow chart of an example process for generating a glossary of alias terms and using the glossary to process text;

SUMMARY

Figure 1:
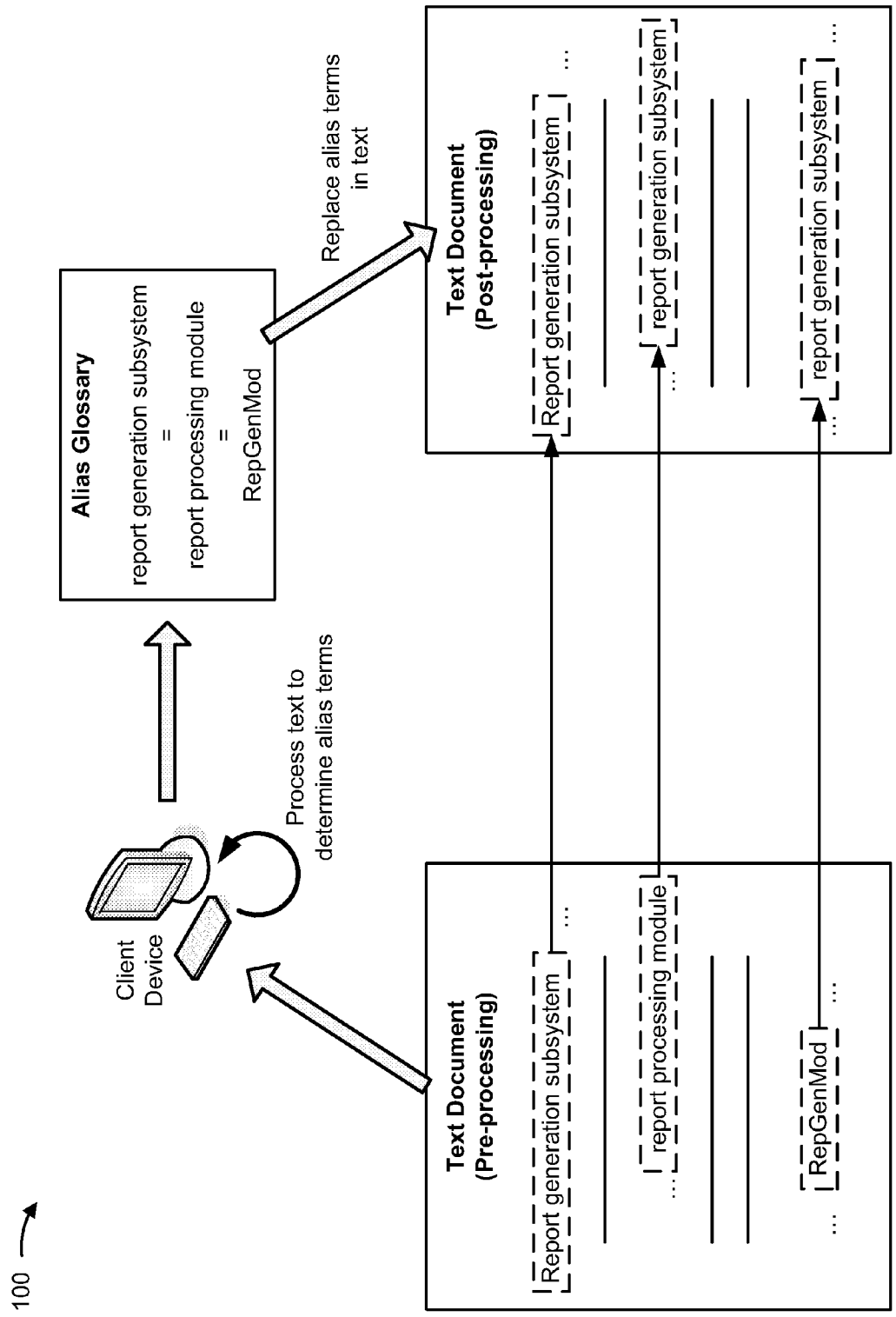
FIG. 1 is a diagram of an overview of an example implementation described herein.

In some implementations, a device analyzes first text to identify a pair of terms, within the first text, that are alias terms. The device analyzes the first text by performing two or more of: a latent semantic analysis of the pair of terms, based on the pair of terms being associated with a particular tag; a tag-based analysis that determines that the pair of terms are associated with compatible tags; a transitive analysis that determines that a pair of neighbor terms, associated with the pair of terms, are associated with compatible tags; or a co-location analysis based on a distance between the pair of terms in the first text. The device generates, based on analyzing the first text, a glossary that includes the pair of terms identified as alias terms. The device replaces terms within the first text or a second text that is different from the first text, using the glossary.

In some implementations, a device performs an alias analysis of a first text to identify a pair of terms, within the first text, that are alias terms. The alias analysis includes at least two of: a latent semantic analysis of terms in the first text, the terms including the pair of terms; a tag-based analysis, of the pair of terms, that determines that the pair of terms are associated with compatible tags; a transitive analysis, of the pair of terms, that determines that a pair of neighbor terms, associated with the pair of terms, are associated with compatible tags; or a co-location analysis, of the pair of terms, based on a distance between the pair of terms in the first text. The device generates, based on performing the alias analysis, a glossary that includes the pair of terms and an indication that the pair of terms are alias terms. The device replaces, within the first text or a second text, a first alias term, of the pair of terms included in the glossary, with a second alias term, of the pair of terms included in the glossary.

In some implementations, a device performs an alias analysis of a text to identify a pair of terms, included in the text, that are alias terms. The alias analysis includes at least three of: a latent semantic analysis of terms included in the text, the terms including the pair of terms; a tag-based analysis, of the pair of terms, that determines that the pair of terms are associated with compatible tags; a transitive analysis, of the pair of terms, that determines that a pair of neighbor terms, associated with the pair of terms, are associated with compatible tags; a co-location analysis, of the pair of terms, based on a distance between the pair of terms in the text; a glossary analysis, of the pair of terms, based on information that identifies synonyms associated with the pair of terms; or a syntactic analysis that includes at least one of: a misspelling analysis, a short form analysis, or an explicit alias analysis. The device generates, based on performing the alias analysis, a glossary that includes the pair of terms and an indication that the pair of terms are alias terms, and the device provides the glossary.

DETAILED DESCRIPTION

The following detailed description of example implementations refers to the accompanying drawings. The same reference numbers in different drawings may identify the same or similar elements.

An author of a text document may use different terminology throughout the document to refer to the same concept or entity. A reader of such a document may be confused by the author's inconsistent use of terms to refer to the same entity, and may not understand that the different terms are referring to the same entity. This may be especially problematic in a design document, where a designer uses the design document to create a system based on the description of the system in the design document. For example, the designer may create a system with multiple components corresponding to the different terms, but the author of the design document may have intended that the different terms refer to a single component. Implementations described herein may eliminate confusion resulting from the inconsistent use of terms in a document, by determining terms in the document that refer to the same entity, and by replacing inconsistent terms with a consistent term.

FIG. 1 is a diagram of an overview of an example implementation 100 described herein. As shown in FIG. 1, implementation 100 may include a client device, such as a desktop computer, that receives a text document, processes the text document to determine alias terms (e.g., terms that refer to the same entity), creates a glossary of the alias terms, and uses the glossary to replace inconsistent terms in the text document.

As further shown in FIG. 1, the pre-processed text document may include different terms that refer to the same entity. For example, the terms "report generation subsystem," "report processing module," and "RepGenMod" may all refer to the same system. The client device may receive the text document (e.g., by obtaining the text document from memory), and may process the text document to determine alias terms in the text document. An alias term, as used herein, may refer to a term in the document that refers to a same or similar entity as another term in the document. The client device may use one or more syntactic analysis techniques and/or semantic analysis techniques, described elsewhere herein, to determine the alias terms in the text document.

The client device may create a glossary of the alias terms. The glossary may identify different terms that refer to the same entity (e.g., alias terms). For example, the alias glossary may indicate that "report generation subsystem," "report processing module," and "RepGenMod" are alias terms (e.g., as shown by "report generation subsystem=report processing module=RepGenMod"). The client device may use the glossary to replace alias terms in the text document with a consistent term (e.g., one of the alias terms). For example, the client device may generate a post-processed text document where "report processing module" and "RepGenMod" have been replaced by "report generation subsystem," as shown. In this way, a text document with inconsistent usage of terms may be modified to generate a text document with consistent usage of terms.

Figure 2:
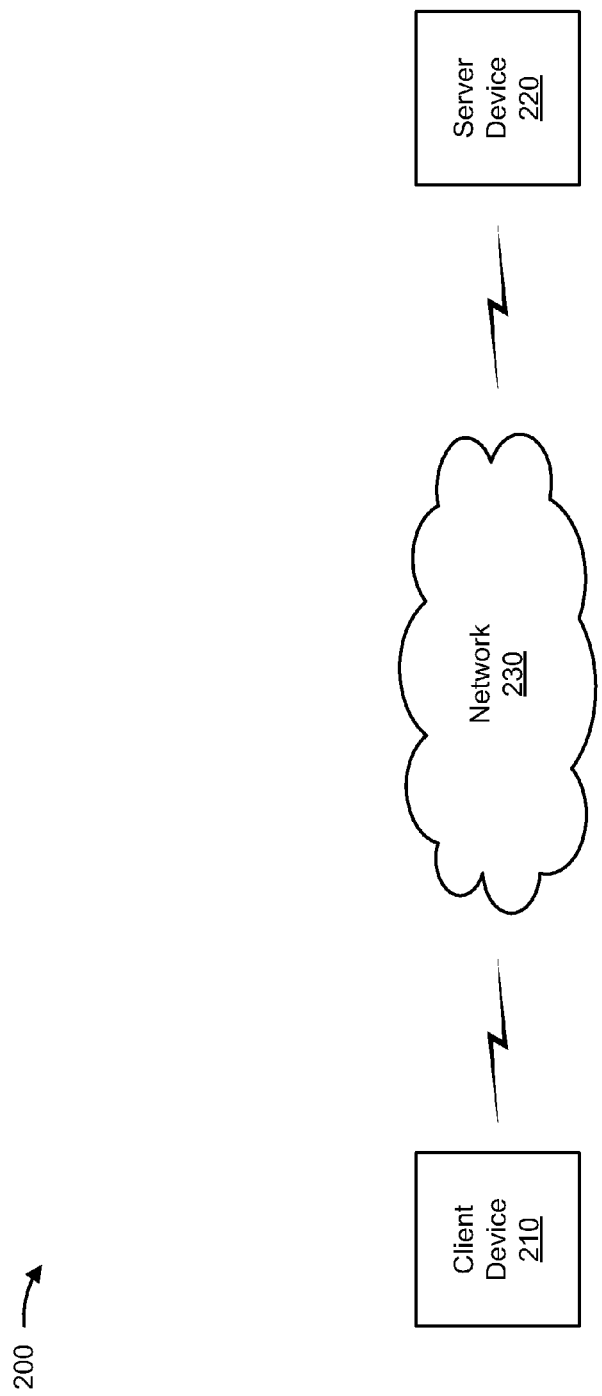
FIG. 2 is a diagram of an example environment in which systems and/or methods described herein may be implemented.

FIG. 2 is a diagram of an example environment in which systems and/or methods described herein may be implemented. As shown in FIG. 2, environment 200 may include a client device 210, a server device 220, and a network 230. Devices of environment 200 may interconnect via wired connections, wireless connections, or a combination of wired and wireless connections.

Client device 210 may include a device capable of receiving, generating, storing, processing, and/or providing a text document and/or information associated with a text document (e.g., information to be used to determine alias terms in the text document). For example, client device 210 may include a computing device (e.g., a desktop computer, a laptop computer, a tablet computer, a handheld computer, a server, etc.), a mobile phone (e.g., a smart phone, a radiotelephone, etc.), or a similar device. In some implementations, client device 210 may receive information from and/or transmit information to server device 220 (e.g., a text document and/or information associated with a text document).

Server device 220 may include one or more devices capable of receiving, generating, storing, processing, and/or providing a text document and/or information associated with a text document. For example, server device 220 may include a computing device, such as a server, a desktop computer, a laptop computer, a tablet computer, a handheld computer, or a similar device.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

The number of devices and/or networks shown in FIG. 2 is provided as an example. In practice, there may be additional, fewer, different, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
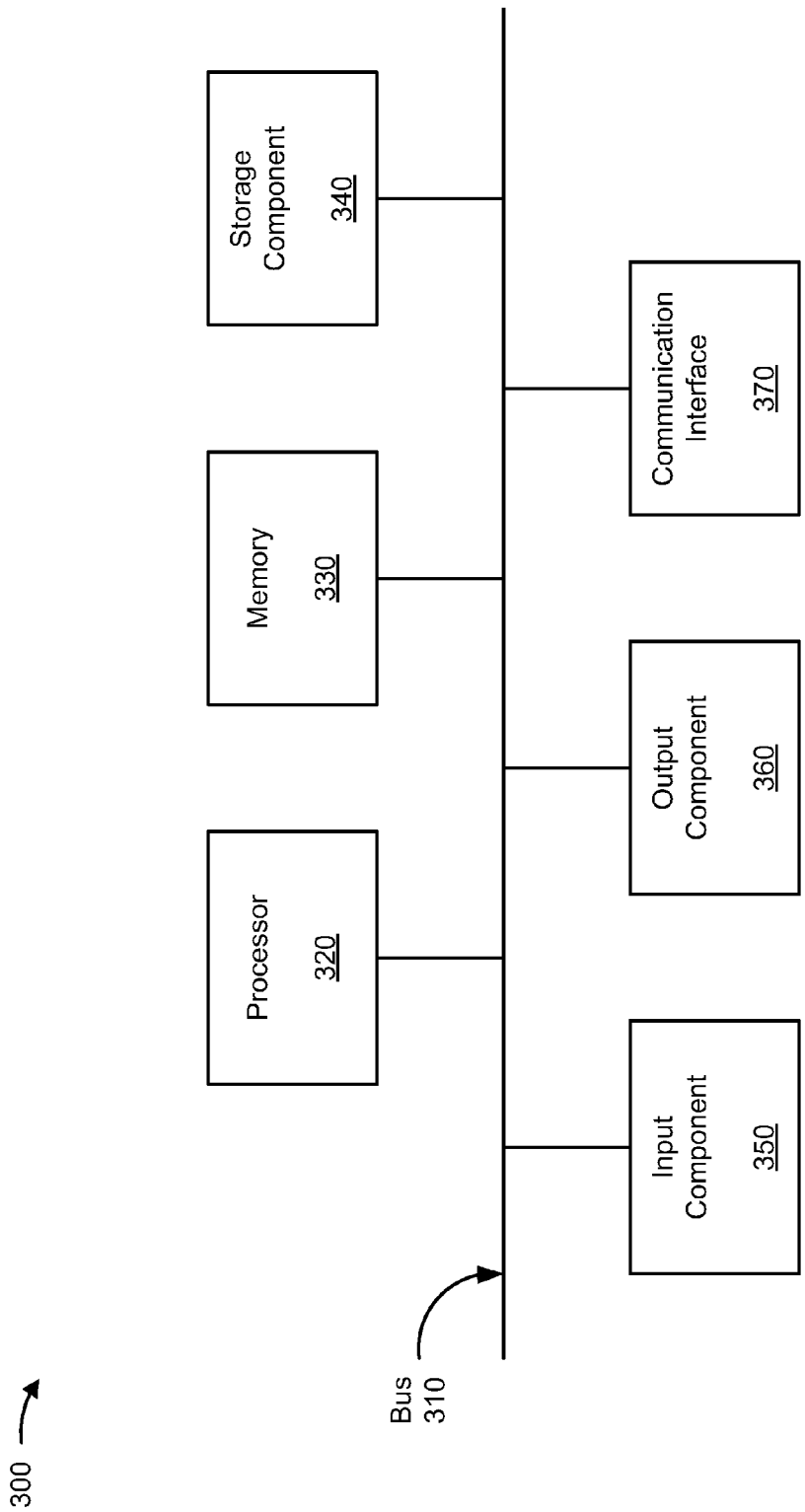
FIG. 3 is a diagram of example components of one or more devices of FIG. 2.

FIG. 3 is a diagram of example components of a device 300, which may correspond to client device 210 and/or server device 220. In some implementations, each of client device 210 and/or server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a path that permits communication among the components of device 300. Processor 320 may include a processor (e.g., a central processing unit, a graphics processing unit, an accelerated processing unit, etc.), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional, fewer, different, or differently arranged components than those shown in FIG. 3. Additionally, or alternatively, one or more components of device 300 may perform one or more functions described as being performed by another one or more components of device 300.

FIG. 4 is a flow chart of an example process 400 for generating a glossary of alias terms and using the glossary to process text. In some implementations, one or more process blocks of FIG. 4 may be performed by client device 210. In some implementations, one or more process blocks of FIG. 4 may be performed by another device or a group of devices separate from or including client device 210, such as server device 220.

As shown in FIG. 4, process 400 may include receiving a request to process text to determine alias terms (block 410). For example, client device 210 may receive the request from a user of client device 210 and/or from another device (e.g., server device 220). In some implementations, client device 210 may receive the request via user interaction with a user interface of client device 210.

The request may identify text to be processed by client device 210. The text may include, for example, a document that includes text (e.g., a text file, a file that includes text and other information, such as images, etc.), a group of documents that include text (e.g., multiple files), a portion of a document that includes text (e.g., a portion indicated by a user, a portion identified by document metadata, etc.), and/or any information that includes text. In some implementations, the request may specify one or more sections of a document to be processed. Additionally, or alternatively, the request may specify a manner in which the sections are to be partitioned for processing. For example, the sections may be sentences, and the request may specify that the sentences be partitioned based on capital letters and/or periods (.). In some implementations, client device 210 may process the sections separately.

In some implementations, the request may identify one or more terms, included in the text, to be processed by client device 210 to determine whether the one or more terms are alias terms of other terms in the text. A term, as used herein, may refer to a particular combination of characters, such as a word, multiple words (e.g., a phrase, a sentence, etc.), a character, multiple characters (e.g., a character string), or the like. An alias term, as used herein, may refer to a term in the text that refers to the same entity (e.g., the same concept, the same item, the same article, the same thing, the same component, etc.) as another, different, term in the text. Alternatively, an alias term may refer to a term in the text that refers to a similar entity as another, different, term in the text. The term and the other, different, term may be referred to as alias terms of one another. For example, the terms "gasoline," "gas," and "fuel" may be alias terms that refer to or label the same entity.

The request may identify one or more alias analysis techniques (sometimes referred to herein as "analysis techniques") to be used by client device 210 to determine the alias terms, in some implementations. For example, the request may identify one or more syntactic analysis techniques (e.g., a misspelling analysis, a short form analysis, an explicit alias analysis, or the like) and/or one or more semantic analysis techniques (e.g., a latent semantic analysis, a tag-based analysis, a transitive analysis, a co-location analysis, a glossary analysis, or the like). Additionally, or alternatively, the request may identify a scoring technique, such as a manner in which results of different analyses are to be combined to determine alias terms. Client device 210 may process the text to determine alias terms based on the identified analysis and/or scoring techniques.

As described in more detail elsewhere herein, the request may identify other information to be used by client device 210 when processing the text to determine alias terms, such as a list of tags to be used when processing the text, a tag compatibility matrix to be used when processing the text, a glossary to be used when processing the text, a language database (e.g., a dictionary, a synonym database, such as WordNet, etc.) to be used when processing the text, a list of stop words to use when processing the text, a list of root words to use when processing the text, or other information described elsewhere herein.

As shown in FIG. 4, process 400 may include obtaining the text and determining text sections to be processed (block 420). For example, client device 210 may receive the request to process the text. The request may include information identifying the text (e.g., a name of a text document) and/or may include information identifying a memory location at which the text is stored. The memory location may be located within client device 210 or external to, and possibly remote from, client device 210. Client device 210 may, based on receiving the request, retrieve the text from the memory location. The text may include multiple files storing text, a single file storing text, a portion of a file storing text, multiple lines of text, a single line of text, a portion of a line of text, etc. The text may include untagged text and/or may include tagged text that has been annotated with one or more tags.

Client device 210 may determine sections of the text to process. For example, the request may indicate a manner in which the text is to be partitioned into sections, and client device 210 may partition the text into sections based on the indication. A text section may include, for example, a sentence, a line, a paragraph, a page, a document, etc. In some implementations, client device 210 may label each text section, and may use the labels when processing the text to determine alias terms. Additionally, or alternatively, client device 210 may process each text section separately (e.g., serially or in parallel).

As further shown in FIG. 4, process 400 may include associating tags with words in the text sections (block 430). For example, client device 210 may receive information that identifies one or more tags, and may associate the tags with words in the text based on tag association rules. The tag association rules may specify a manner in which the tags are to be associated with the words, based on characteristics of the words. For example, a tag association rule may specify that a singular noun tag ("/NN") is to be associated with words that are singular nouns (e.g., based on a language database, a context analysis, etc.).

A word, as used herein, may refer to a unit of language, consisting of one or more characters. A word may include a dictionary word (e.g., "gas") or may include a non-dictionary string of characters (e.g., "asg"). In some implementations, a word may be a term. Alternatively, a word may be a subset of a term (e.g., a term may include multiple words). Client device 210 may determine words in the text by determining characters identified by one or more delimiting characters, such as a space, a punctuation mark (e.g., a comma, a period, an exclamation point, a question mark, etc.), or the like.

As an example, client device 210 may receive a list of part-of-speech tags (POS tags) and tag association rules for tagging words in the text with the POS tags based on the part-of-speech of the word. Client device 210 may also receive text that includes the following sentence:

The gasoline engine powers the car.

Client device 210 may tag the sentence with POS tags, as follows:

the/DT
gasoline/NN
engine/NN
powers/VB
the/DT
car/NN.

In the above tagged sentence, DT may represent a determiner tag (e.g., used to tag articles like a, an, and the), NN may represent a singular noun or mass noun tag (e.g., used to tag singular or mass nouns), and VB may represent a base-form verb tag (e.g., used to tag verbs in base form). These tags are provided as an example, and client device 210 may use other tags in some implementations, as described elsewhere herein.

In some implementations, client device 210 may further process the tagged text to associate additional or alternative tags with groups of words that meet certain criteria. For example, client device 210 may associate an entity tag (e.g., ENTITY) with noun phrases (e.g., consecutive words with a noun tag). Client device 210 may apply entity tags to the tagged text, as follows:

the/DT
{gasoline engine}/ENTITY
powers/VB
the/DT
car/NN.

As can be seen, the nouns "gasoline" and "engine" have been combined into a single term "gasoline engine" (e.g., set off by braces { }), and have been tagged with an entity tag. In some implementations, client device 210 may only process terms with particular tags, such as noun tags or entity tags, when determining alias terms.

As shown in FIG. 4, process 400 may include generating a list of unique terms based on the tags (block 440). For example, client device 210 may generate a list of unique terms associated with one or more tags. In some implementations, the list may include terms tagged with a noun tag, or a tag derived from a noun tag (e.g., an entity tag associated with a noun phrase). The terms in the list may be unique in that each term is included only once in the list (e.g., duplicate terms are merged into a single term).

In some implementations, client device 210 may receive information that identifies stop tags or stop terms. The stop tags may identify tags associated with terms that are not to be included in the list of unique terms. Similarly, the stop terms may identify terms that are not to be included in the list of unique terms. When generating the list of unique terms, client device 210 may only add terms to the list that are not associated with a stop tag or identified as a stop term.

Additionally, or alternatively, client device 210 may convert terms to a root form when adding the terms to the list of unique terms. For example, the terms "processes," "processing," "processed," and "processor" may all be converted to the root form "process." Similarly, the term "devices" may be converted to the root form "device." Thus, when adding terms to the list of unique terms, client device 210 may convert the terms "processing device," "processed devices," and "processor device" into the root form "process device." Client device 210 may add the root term "process device" to the list of unique terms.

As further shown in FIG. 4, process 400 may include determining alias terms included in the list of unique terms (block 450). For example, client device 210 may analyze two or more terms, included in the list of unique terms, to determine whether the two or more terms are alias terms. For example, client device 210 may analyze the terms using one or more syntactic analysis techniques, such as a misspelling analysis, a short form analysis, an explicit alias analysis, or the like. Additionally, or alternatively, client device 210 may analyze the terms using one or more semantic analysis techniques, such as a latent semantic analysis, a tag-based analysis, a transitive analysis, a co-location analysis, a glossary analysis, or the like. Client device 210 may use the analysis technique to determine whether the two or more terms are alias terms. Further details regarding these syntactic and semantic analysis techniques are described herein in connection with FIG. 6.

In some implementations, client device 210 may generate an alias score for the two or more terms, based on the analysis technique used to analyze the two or more terms. Additionally, or alternatively, client device 210 may generate an overall alias score for the two or more terms by combining alias scores for multiple analysis techniques. Client device 210 may use the alias score and/or the overall alias score to determine whether the two or more terms are alias terms. Further details regarding alias scores are described herein in connection with FIG. 6.

As further shown in FIG. 4, process 400 may include generating a glossary that includes the alias terms (block 460). For example, client device 210 may generate a glossary that includes alias terms determined based on the applied analysis techniques, the alias score, and/or the overall alias score. The glossary may include the alias terms, and may include an indication of which of the alias terms are associated with one another. For example, the glossary may provide an indication of an association between a first group of alias terms (e.g., gas, gasoline, fuel, etc.), may provide an indication of an association between a second group of alias terms (e.g., restaurant, diner, eatery, etc.), and so on.

In some implementations, client device 210 may generate an initial glossary based on the applied analysis techniques, the alias score, and/or the overall alias score. Client device 210 may then refine the initial glossary to create a final glossary by removing incorrect alias terms included in the initial glossary. In some implementations, client device 210 may refine the initial glossary based on user input, such as user identification of incorrect alias terms. Additionally, or alternatively, client device 210 may refine the initial glossary based on a term elimination technique. Further details regarding the term elimination technique are described herein in connection with FIG. 7.

As further shown in FIG. 4, process 400 may include processing the text, using the glossary, to replace alias terms in the text with a single term of the alias terms (block 470). For example, client device 210 may search the text to identify alias terms that are included in the glossary. Client device 210 may replace the identified alias terms, in the text, with a single alias term. Thus, after processing, a single entity may be referred to by a single alias term, whereas before processing, the single entity may have been referred to by multiple alias terms.

In some implementations, client device 210 may receive information that identifies a primary alias term, of the alias terms. Client device 210 may use the primary alias term to replace the other alias terms in the text (e.g., that are aliases of the primary alias term). In some implementations, client device 210 may receive user input that identifies the primary alias term. Additionally, or alternatively, client device 210 may determine the primary alias term based on characteristics of the alias terms (e.g., which alias term appears first in the text, which alias term appears most often in the text, which alias term is spelled correctly, which alias term includes the highest/lowest number of characters, etc.).

For example, client device 210 may analyze the following text:

The gasoline engine powers the car. My car uses a lot of gas. I must put fuel in my car at the gas station every other day.

Client device 210 may determine that "gasoline," "gas," and "fuel," are alias terms, and may receive an indication that "gasoline" is the primary alias term (e.g., based on user input, based on "gasoline" appearing first in the text, based on "gasoline" including more characters than "gas" or "fuel," etc.). Client device 210 may process the text, using "gasoline" to replace "gas" and "fuel," to produce the following text:

The gasoline engine powers the car. My car uses a lot of gasoline. I must put gasoline in my car at the gasoline station every other day.

In some implementations, client device 210 may generate the glossary based on analyzing a particular text, and may use the glossary to replace alias terms in the particular text. Additionally, or alternatively, client device 210 may generate the glossary based on analyzing a first text, and may use the glossary to replace alias terms in a second text that is different from the first text. Additionally, or alternatively, a user may specify alias terms for client device 210 to replace in a particular text.

While a series of blocks has been described with regard to FIG. 4, the blocks and/or the order of the blocks may be modified in some implementations. Additionally, or alternatively, non-dependent blocks may be performed in parallel.

FIGS. 5A-5I are diagrams of an example implementation 500 relating to example process 400 shown in FIG. 4. FIGS. 5A-5I show an example of processing text to replace alias terms in the text with a single alias term.

Figure 5A:
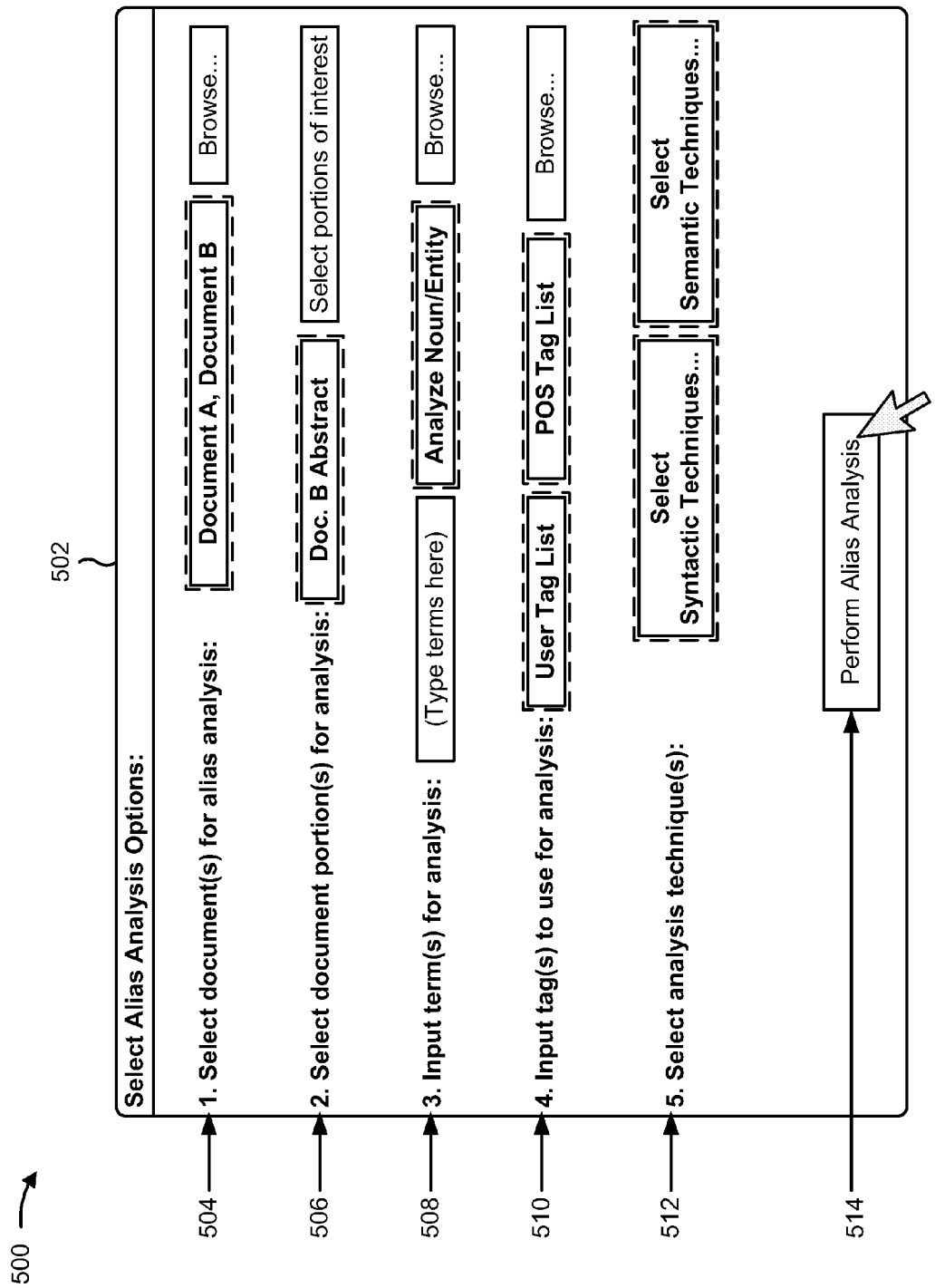
FIGS. 5A-5I are diagrams of an example implementation relating to the example process shown in FIG. 4.

As shown in FIG. 5A, client device 210 may provide a user interface 502 for a user to input options associated with processing the text to determine alias terms. As shown by reference number 504, the user may input one or more documents on which to perform the alias analysis. For example, the user may type a name of the document(s) and/or may browse a list of files and select the document(s) from the list of files (e.g., by interacting with a "Browse . . . " button). As shown by reference number 506, the user may select a portion of text, in one or more of the documents, on which to perform the alias analysis. For example, the user may type a name of a portion of the document(s) (e.g., abstract, summary, description, etc.). Additionally, or alternatively, user interface 502 may provide a mechanism (e.g., a "Select portions of interest" button) that provides the document(s) for a user to view, and that allows the user to interact with the document(s) to select portion(s) on which to perform the alias analysis (e.g., by highlighting portions of text).

As shown by reference number 508, the user may input one or more terms on which to perform the alias analysis. For example, the user may input terms via a text box, and/or may browse a list of terms and select the term(s) from the list (e.g., by interacting with a "Browse . . . " button). Alternatively, the user may select an option that causes client device 210 to analyze all terms in the selected text (e.g., the selected document(s) and/or portions of document(s)), or to analyze terms associated with a particular tag (e.g., by interacting with an "Analyze Noun/Entity" button).

As shown by reference number 510, the user may input one or more tags to be used in the alias analysis. For example, the user may input tags via a text box, and/or may browse a list of tags and select the tag(s) from the list (e.g., by interacting with a "Browse . . . " button). Alternatively, the user may select an option that causes client device 210 to use a default list of tags, such as a list of part-of-speech tags (e.g., by interacting with a "POS Tag List" button).

As shown by reference number 512, the user may input one or more alias analysis techniques to be used to perform the alias analysis. For example, the user may select one or more syntactic analysis techniques, such as a misspelling analysis, a short form analysis, an explicit alias analysis, or the like (e.g., by interacting with a "Select Syntactic Techniques . . . " button). Additionally, or alternatively, the user may select one or more semantic analysis techniques, such as a latent semantic analysis, a tag-based analysis, a transitive analysis, a co-location analysis, a glossary analysis, or the like (e.g., by interacting with a "Select Semantic Techniques . . . " button).

As shown by reference number 514, user interface 502 may provide an input mechanism (e.g., a "Perform Alias Analysis" button) for the user to cause client device 210 to perform an alias analysis using the selected options. In example implementation 500, assume the user has input the highlighted options (e.g., indicated in FIG. 5A using bold text and a dotted-line rectangle around the selected options). As shown, assume the user has selected to analyze a document named "Document A" and an "Abstract" portion of "Document B." Further assume the user has selected to analyze terms tagged with a noun tag or an entity tag, and assume that the user has selected two tag lists, named "User Tag List" and "POS Tag List," to be used to analyze Document A and Document B Abstract. Finally, assume the user has selected at least one syntactic analysis technique and at least one semantic analysis technique.

Figure 5B:
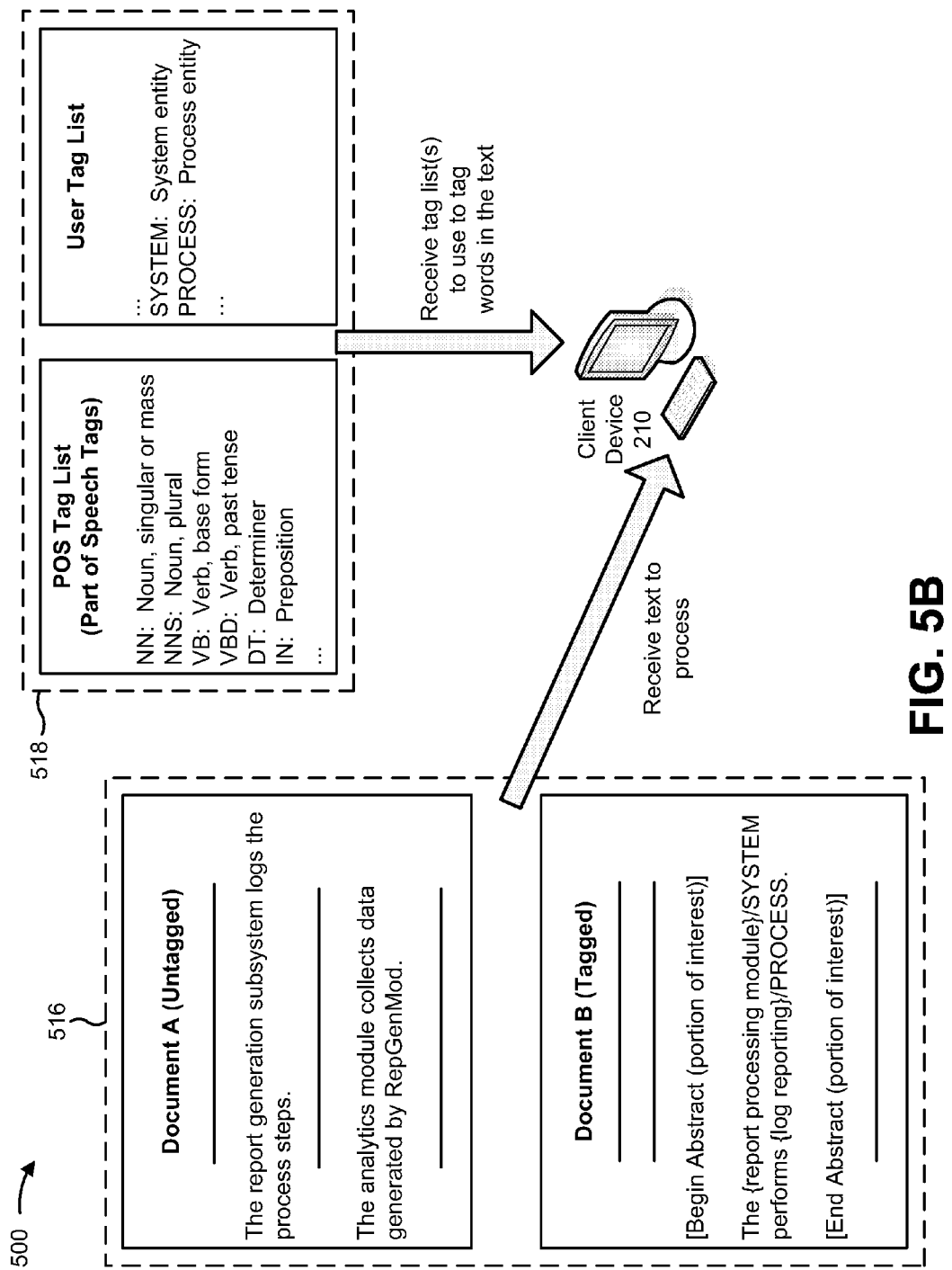

As shown in FIG. 5B, client device 210 may obtain the user-selected text 516 (e.g., Document A and Document B Abstract), and may obtain the user-selected tag lists 518 (e.g., POS Tag List and User Tag List). As shown, Document A may include the following untagged text:

The report generation subsystem logs the process steps.
The analytics module collects data generated by RepGenMod.

As further shown, Document B Abstract may include the following text:

The report processing module performs log reporting.
The text in Document B Abstract may be tagged as follows:
The {report processing module}/SYSTEM performs {log reporting}/PROCESS.

Thus, the term "report processing module" may be tagged with a SYSTEM tag, and the term "log reporting" may be tagged with a PROCESS tag.

As further shown, the POS Tag List may include the following tags:
NN: Noun, singular or mass
NNS: Noun, plural
VB: Verb, base form
VBD: Verb, past tense
DT: Determiner
IN: Preposition.

The User Tag List may include the following tags:
SYSTEM: System entity
PROCESS: Process entity The User Tag List may be associated with Document B Abstract (e.g., the SYSTEM and PROCESS tags). Client device 210 may receive text 516 and tag lists 518, and may process text 516 using tag lists 518.

Figure 5C:
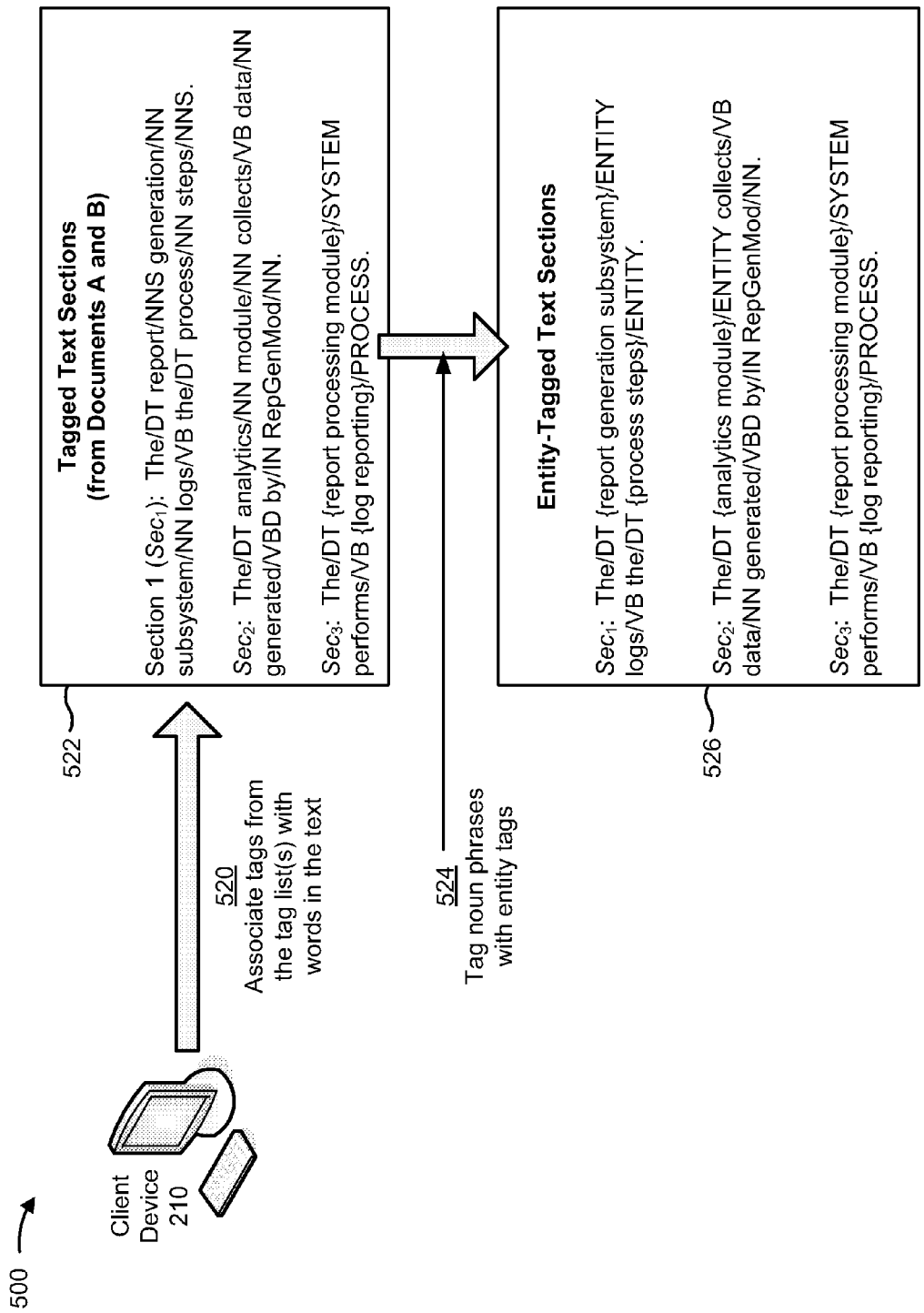

As shown in FIG. 5C (reference number 520), client device 210 may associate tags, from tag lists 518, with words in text 516 to generate tagged text sections 522. Prior to associating the tags with text 516, client device 210 may determine one or more text sections of text 516 to process. For example, client device 210 may determine that a first section of Document A, labeled $Sec_1$, corresponds to a first sentence of Document A: "The report generation subsystem logs the process steps." Similarly, client device 210 may determine that a second section of Document A, labeled $Sec_2$, corresponds to a second sentence of Document A: "The analytics module collects data generated by RepGenMod." Finally, client device 210 may determine that a section of Document B Abstract, labeled $Sec_3$, corresponds to a sentence of Document B Abstract: "The report processing module performs log reporting."

Client device 210 may process the text sections to associate the tags from tag lists 518 with words in the text sections. For example, client device 210 may tag section 1 as follows:

The/DT report/NNS generation/NN subsystem/NN logs/VB the/DT process/NN steps/NNS.

The above tagged text sections indicates the "the" is a determiner (DT); "report" and "steps" are plural nouns (NNS);

"generation," "subsystem," and "process" are singular or mass nouns (NN); and "logs" is a verb base form (VB).

Client device 210 may tag section 2 and section 3 in a similar manner, as shown in tagged text sections 522. When associating tags with section 3, client device 210 may, in some implementations, tag untagged terms (e.g., "the" and "performs"). Additionally, or alternatively client device 210 may ignore terms that have already been tagged (e.g., "report processing module" and "log reporting"), or may add additional tags (e.g., POS tags) to terms that have already been tagged.

As shown by reference number 524, client device 210 may process tagged text sections 522 by tagging noun phrases with an entity tag to generate entity-tagged text sections 526. A noun phrase may include two or more consecutive words that have each been tagged with a noun tag (e.g., NN, NNS, etc.). For example, client device may tag the noun phrase "report/NNS generation/NN subsystem/NN" with an entity tag, and may optionally remove the noun tags, to generate the entity-tagged phrase "{report generation subsystem}/ENTITY." Similarly, client device 210 may tag the noun phrases "process steps," and "analytics module" with an entity tag, as shown.

Figure 5D:
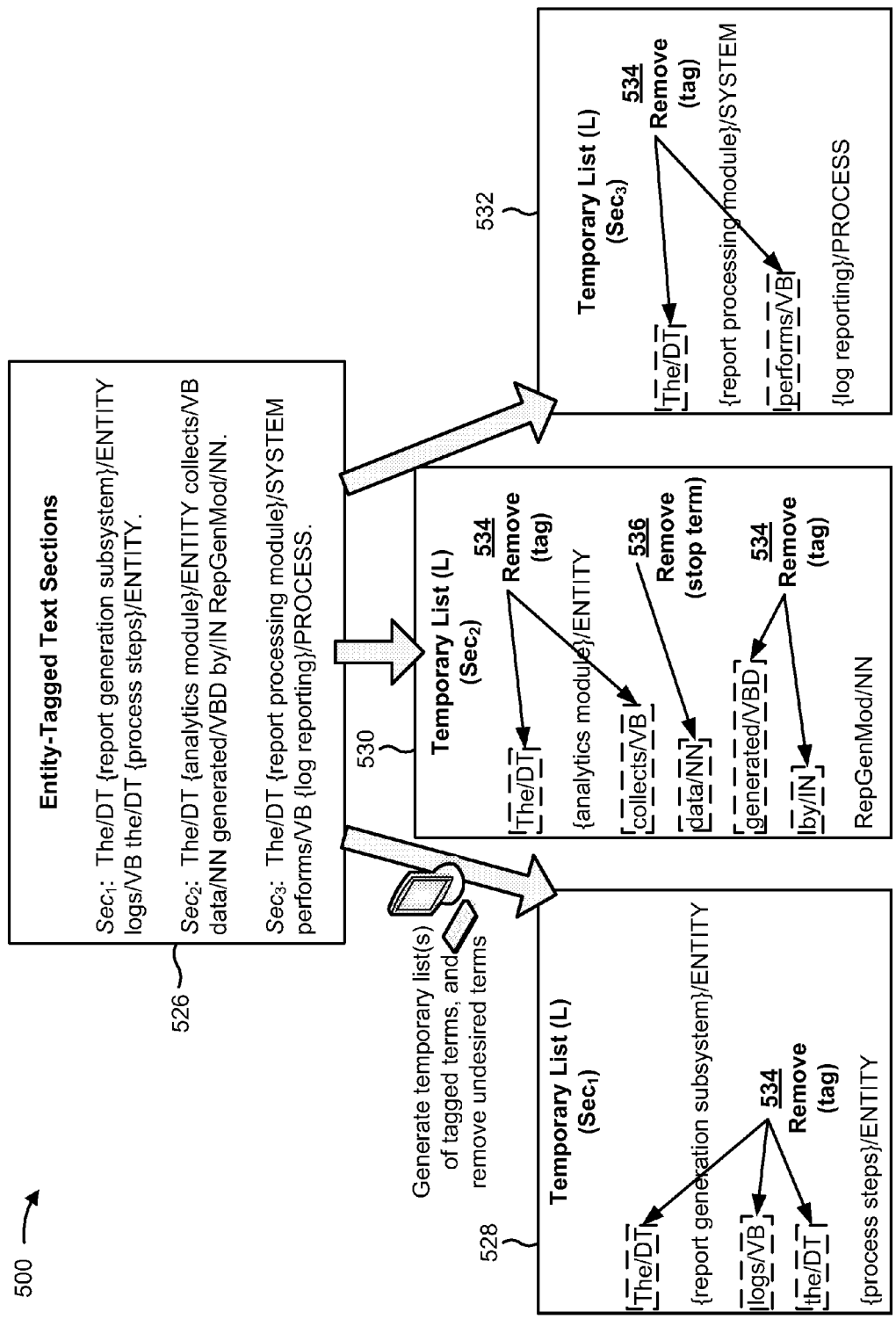

As shown in FIG. 5D, client device 210 may process entity-tagged text sections 526 to generate temporary lists (L) of tagged terms. In some implementations, client device 210 may process the text sections (e.g., $Sec_1$, $Sec_2$, and $Sec_3$) separately, and may generate a temporary list associated with each text section. For example, temporary list 528 may correspond to text section 1, temporary list 530 may correspond to text section 2, and temporary list 532 may correspond to text section 3.

As further shown in FIG. 5D, client device 210 may remove undesired terms from the temporary lists. Undesired terms may include terms associated with a particular tag and/or terms identified as stop terms. As shown by reference number 534, client device 210 may remove terms from the temporary lists based on a tag associated with the term. For example, client device 210 may remove terms, from temporary lists 528-532, associated with the DT, VB, VBD, or IN tags. As shown by reference number 536, client device 210 may remove terms from the temporary lists based on identifying the term as a stop term (e.g., based on a received list of stop terms, such as a stop term list input by a user). For example, client device 210 may remove the term "data" from temporary list 530.

Figure 5E:
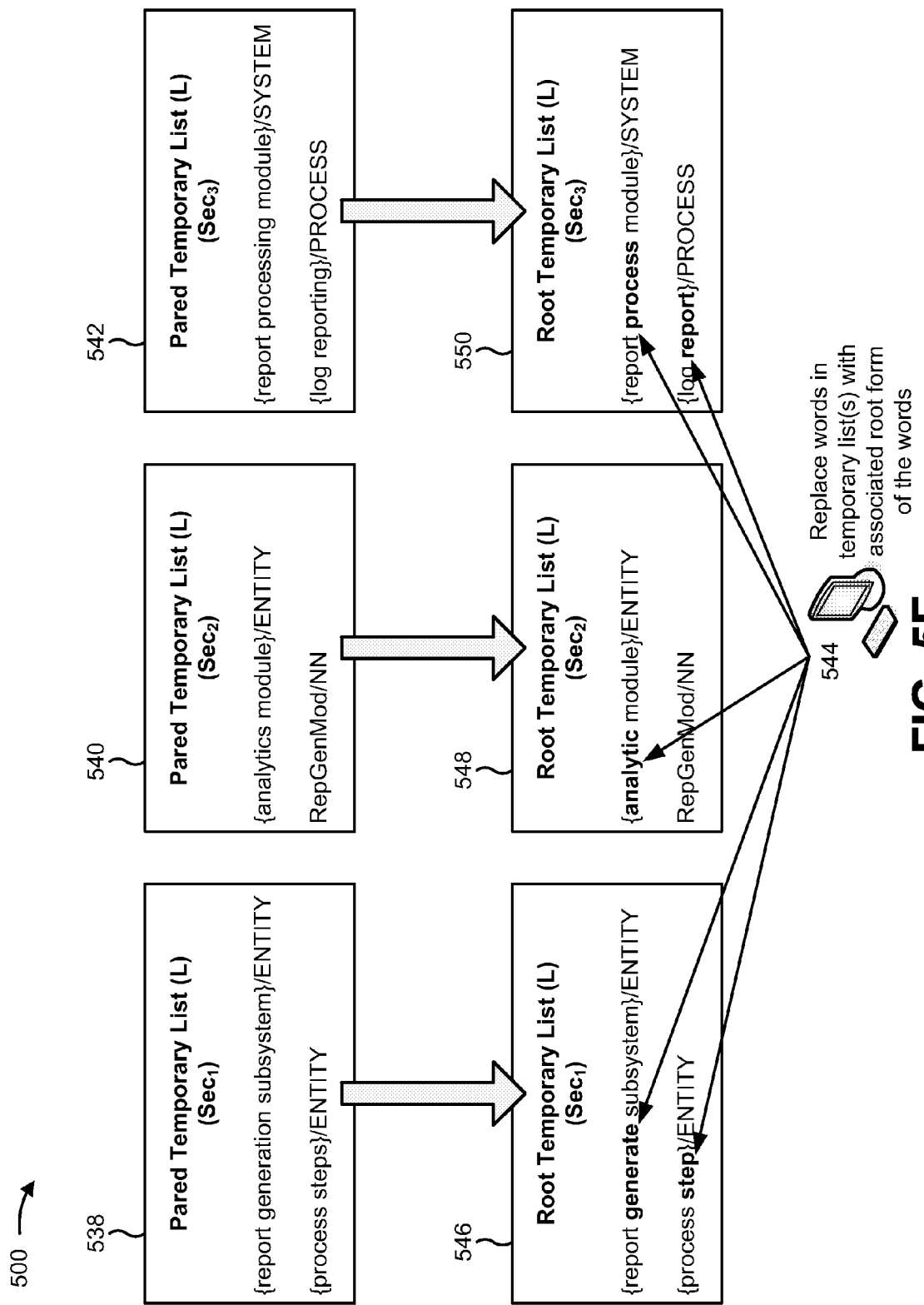

As shown in FIG. 5E, once the undesired terms have been removed from temporary lists 528-532, the temporary lists may be referred to as pared temporary lists 538-542. As shown by reference number 544, client device 210 may process pared temporary lists 538-542, by replacing words in pared temporary lists 538-542 with root forms of the words, to generate root temporary lists 546-550. For example, client device 210 may replace the words "generation" and "steps," in pared temporary list 538, with the words "generate" and "step," respectively, to generate root temporary list 546. Similarly, client device 210 may replace the word "analytics," in pared temporary list 540, with the word "analytic," to root stemmed temporary list 548. Finally, client device 210 may replace the words "processing" and "reporting," in pared temporary list 542, with the words "process" and "report," respectively, to generate root temporary list 550.

Figure 5F:
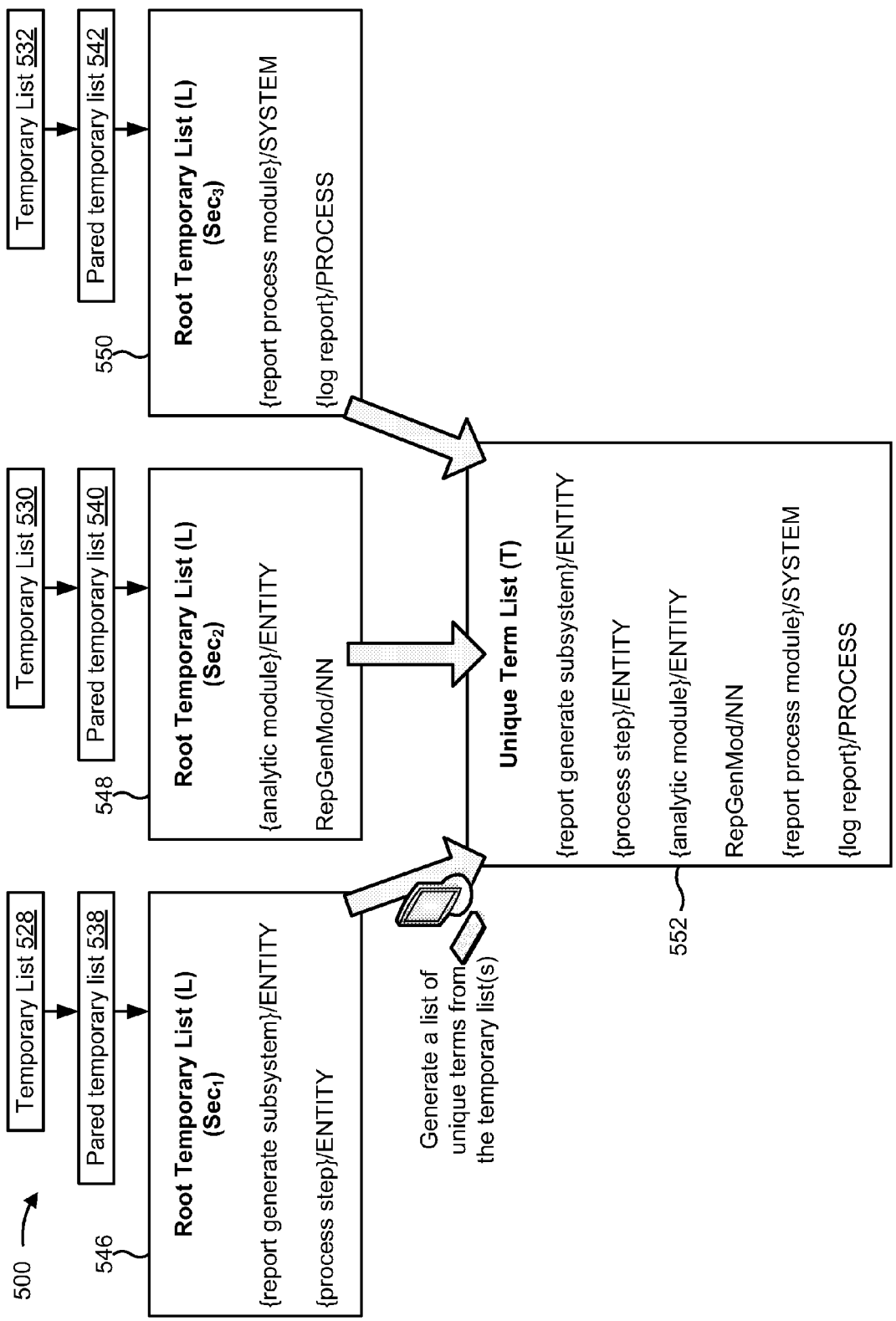

As shown in FIG. 5F, client device 210 may generate a unique term list (T) 552 from root temporary lists 546-550. Client device 210 may generate unique term list 552, for example, by processing temporary lists sequentially. For example, client device 210 may process a first text section, may generate temporary list 528 from the first text section ($Sec_1$), may generate pared temporary list 538 from temporary list 528, may generate root temporary list 546 from pared temporary list 538, and may add the terms in root temporary list 546 to unique term list 552. Client device 210 may process the second text section ($Sec_2$) and the third text section ($Sec_3$) in a similar manner to generate unique term list 552.

In some implementations, client device 210 may only add terms to unique term list 552 (e.g., from a root temporary list) that are not already included in unique term list 552. For example, assume that unique term list 552 includes the term "report generate subsystem," as shown. Based on unique term list 552 including the term "report generate subsystem," client device 210 may not add terms with the same roots (e.g., "report generate subsystem") to unique term list 552, such as the terms "report generating subsystems," "reporting generation subsystem," or the like.

Figure 5G:
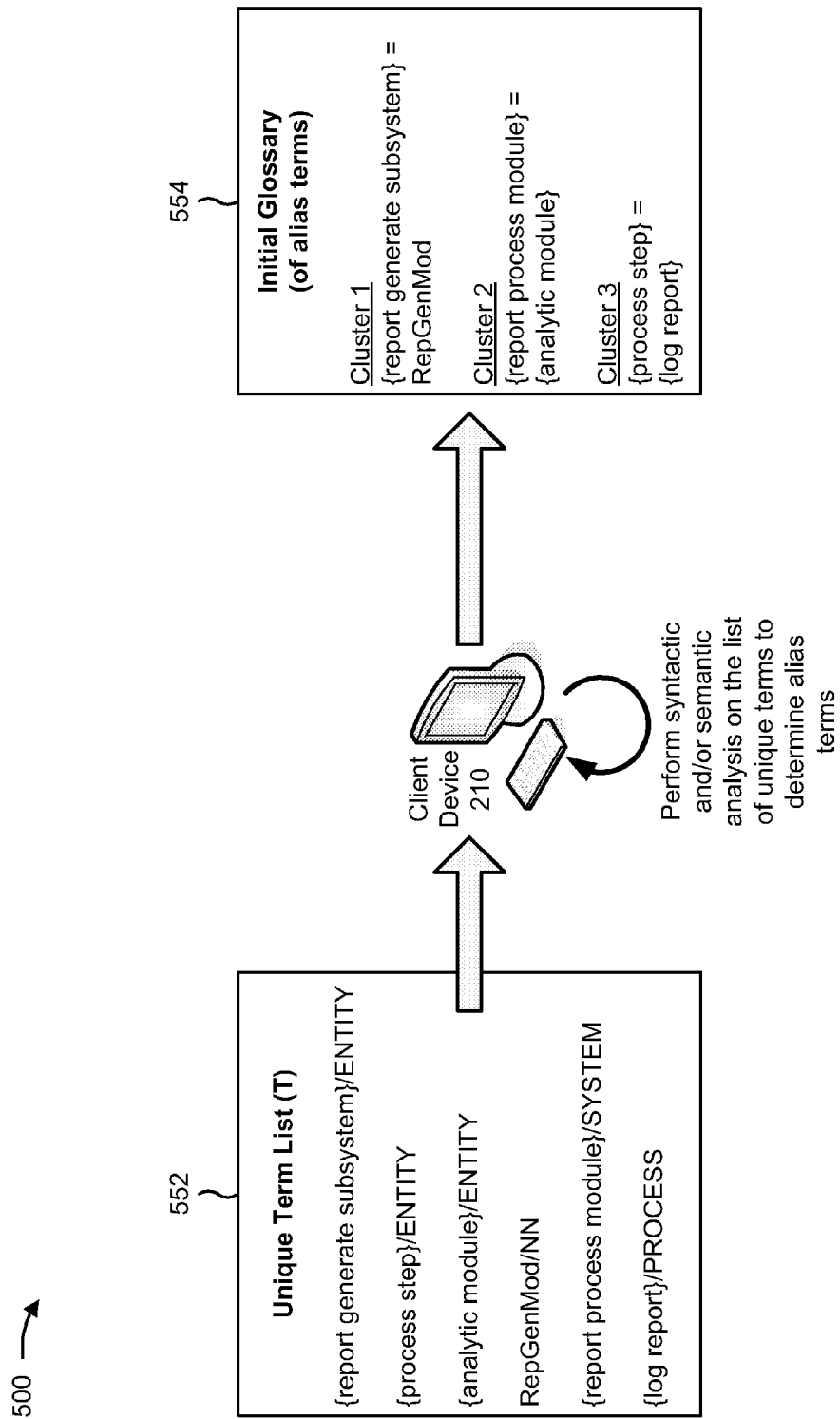

As shown in FIG. 5G, client device 210 may perform a syntactic and/or a semantic analysis on the terms in unique term list 552 to determine alias terms. Based on the analyses, client device 210 may generate initial glossary 554, which may provide an indication of terms in unique term list 552 that are alias terms. For example, initial glossary 554 may indicate that "report generate subsystem" and "RepGenMod" are alias terms (e.g., shown as Cluster 1), may indicate that "report process module" and "analytic module" are alias terms (e.g., shown as Cluster 2), and may indicate that "process step" and "log report" are alias terms (e.g., shown as Cluster 3).

In some implementations, client device 210 may use initial glossary 554 to replace alias terms, in the text, with a single alias term. Alternatively, client device 210 may remove incorrect alias terms from initial glossary 554 to generate a final glossary, and may use the final glossary to replace alias terms, in the text, with a single alias term.

Figure 5H:
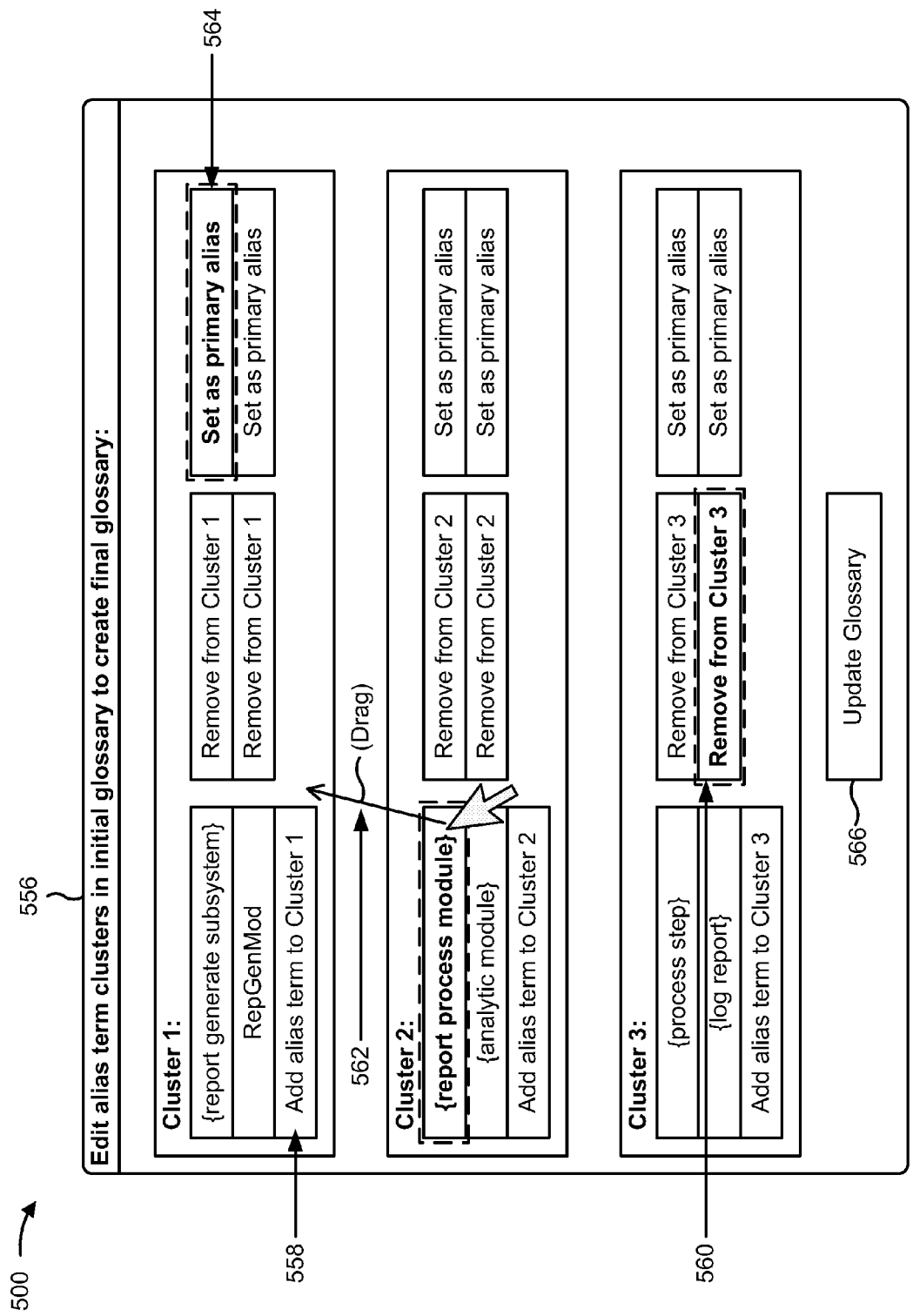

As shown in FIG. 5H, client device 210 may provide a user interface 556 that allows a user to provide input to remove incorrect alias terms from initial glossary 554, to add alias terms to initial glossary 554, and/or to edit alias terms included in initial glossary 554. User interface 556 in FIG. 5H depicts three clusters of alias terms, corresponding to Clusters 1, 2, and 3 in initial glossary 554 (FIG. 5G).

In some implementations, user interface 556 may provide an input mechanism 558 for a user to add an alias term to a cluster (e.g., an "Add alias term to Cluster" button). For example, input mechanism 558 may provide a mechanism (e.g., a text box) that allows a user to type an alias term to be added to the cluster. Additionally, or alternatively, input mechanism 558 may provide a mechanism (e.g., a list box, a drop-down box, etc.) that displays terms included in unique term list 552 (and/or in text 516), other than terms included in the cluster, and that allows a user to select a displayed term to be added to the cluster.

When the user selects to add, to a first cluster, a term included in a second cluster (e.g., to add a term from Cluster 2 to Cluster 1), user interface 556 may provide a mechanism to select whether the term is to be removed from the second cluster and/or whether the terms included in the second cluster are to be merged with the terms in the first cluster (e.g., whether the terms in Cluster 2 should be included as alias terms of the terms in Cluster 1).

User interface 556 may provide an input mechanism 560 for a user to remove an alias term from a cluster, in some implementations (e.g., a "Remove from Cluster" button). For example, input mechanism 560 may include a button, associated with a term in the cluster, that a user may select to remove the term from the cluster. Additionally, or alternatively, input mechanism 560 may provide a mechanism (e.g., a text box) that allows a user to type an alias term to be removed from the cluster. Additionally, or alternatively, input mechanism 560 may provide a mechanism (e.g., a list box, a drop-down box, etc.) that displays terms included in the cluster, and that allows a user to select a displayed term to be removed from the cluster.

When removal of a term from a cluster results in only one term remaining in the cluster, client device 210 may automatically remove the remaining term from the cluster. Alternatively, client device 210 may prompt the user to select whether to remove the remaining term from the cluster. For example, if the user selects to remove "{log report}" from Cluster 3, client device 210 may also remove "{process step}" from Cluster 3, and/or may prompt the user to select whether to remove "{process step}" from Cluster 3.

In some implementations, user interface 556 may provide an input mechanism 562 for a user to simultaneously add an alias term to a first cluster and remove the alias term from a second cluster. For example, the user may click, drag, and drop the term "{report process module}" from Cluster 2 to Cluster 1, via the user interface, to add "{report process module}" to Cluster 1 and to remove "{report process module}" from Cluster 2.

As further shown in FIG. 5H, user interface 556 may provide an input mechanism 564 for a user to select an alias term as a primary alias term. Client device 210 may use the selected primary alias term to replace other alias terms, in the same cluster as the primary alias term, in the text. For example, setting the term "{report generate subsystem}" as the primary alias term may cause client device to replace "RepGenMod," in the text, with "{report generate subsystem}" (or a corresponding non-root term, such as "report generation subsystem").

As shown by reference number 566, user interface 556 may provide an input mechanism (e.g., an "Update Glossary" button) for the user to cause client device 210 to update the glossary (e.g., initial glossary 554) based on the user edits. In example implementation 500, assume the user has input the highlighted options (e.g., indicated in FIG. 5H using bold text and a dotted-line rectangle around the selected options). As shown, assume the user has selected to move "{report process module}" from Cluster 2 to Cluster 1, which causes "{analytic module}" to be removed from Cluster 2. Further assume the user has selected to remove "{log report}" from Cluster 3, which also causes "{process step}" to be removed from Cluster 3. Thus, the user selections result in a single cluster (e.g., Cluster 1) that includes the alias terms "{report generate subsystem}," "RepGenMod," and "{report process module}." Finally, assume that the user has selected "{report generate subsystem}" as the primary alias for Cluster 1.

Figure 5I:
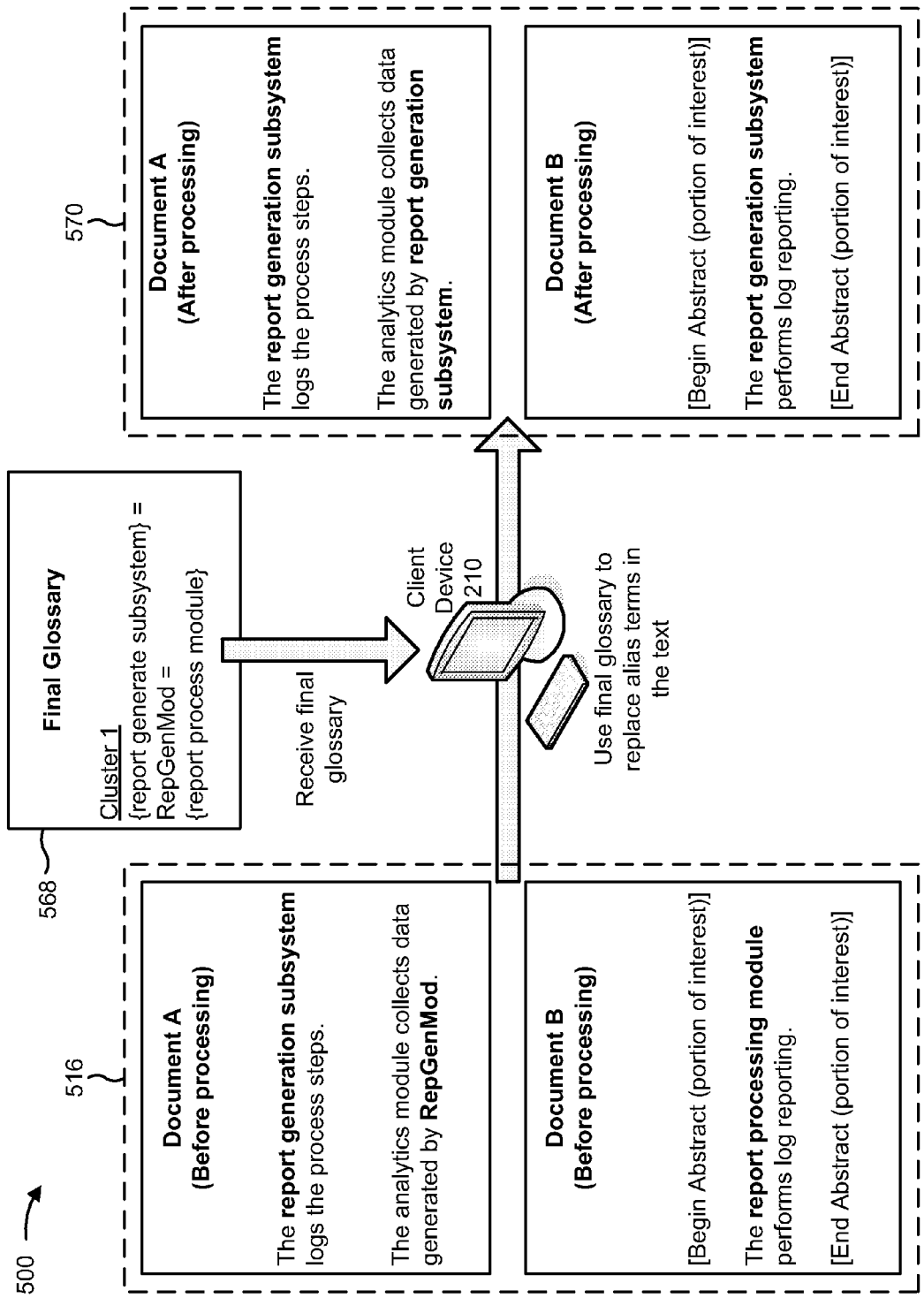

As shown in FIG. 5I, client device 210 may generate a final glossary 568 based on the user edits to initial glossary 554. As shown, final glossary 568 includes three alias terms in Cluster 1: "{report generate subsystem}," "RepGenMod," and "{report process module}." Client device 210 may receive final glossary 568, and may process text 516 to replace alias terms, included in Cluster 1, with the primary alias term in Cluster 1 (e.g., "{report generate subsystem}").

As shown, client device 210 may replace the alias terms "RepGenMod" and "{report process module}," in text 516, with the primary alias term "{report generate subsystem}," to generate processed text 570. In some implementations, client device 210 may use the root form of an alias term (e.g., "{report process module}") to find non-root forms of the alias term in text 516 (e.g., "report processing module," "report processor modules," etc.). Client device 210 may replace the non-root forms of the alias terms in text 516 with a single non-root form of the primary alias term (e.g., "report generation subsystem"), which may be referred to as a primary non-root alias term.

In some implementations, client device 210 may receive user input that identifies the primary non-root alias term. Additionally, or alternatively, client device 210 may determine the primary non-root alias term based on characteristics of the non-root forms of the alias term in text 516 (e.g., which non-root form appears first in the text, which non-root form appears most often in the text, which non-root form is spelled correctly, which non-root form includes the highest/lowest number of characters, etc.).

Figure 6:
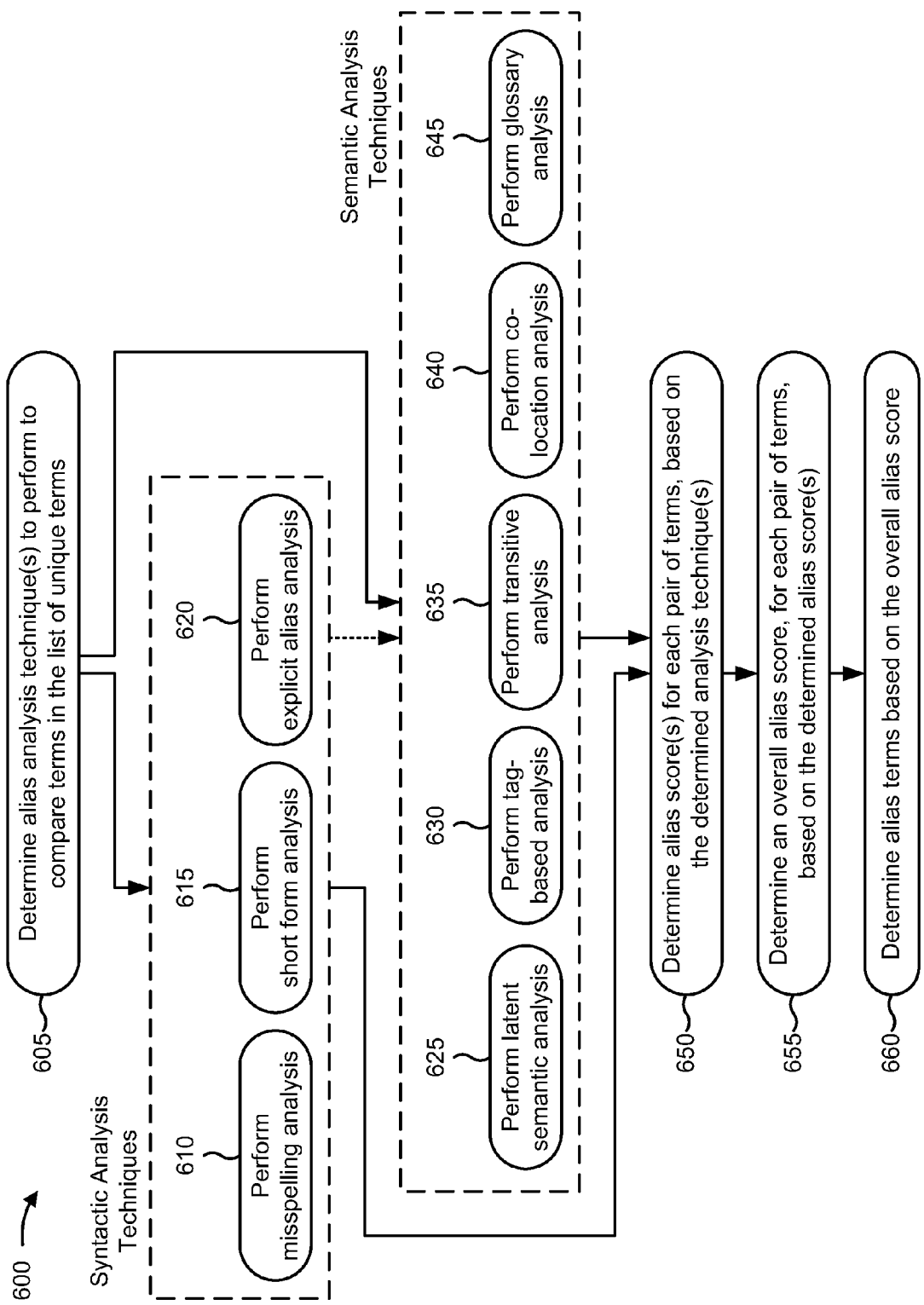
FIG. 6 is a flow chart of an example process for determining alias terms using one or more analysis techniques.

FIG. 6 is a flow chart of an example process 600 for determining alias terms using one or more analysis techniques. In some implementations, process 600 may correspond to process block 450. In some implementations, one or more process blocks of FIG. 6 may be performed by client device 210. In some implementations, one or more process blocks of FIG. 6 may be performed by another device or a group of devices separate from or including client device 210, such as server device 220.

As shown in FIG. 6, process 600 may include determining one or more alias analysis techniques to perform to compare terms in the list of unique terms (block 605). For example, client device 210 may determine the analysis technique(s) to perform, to determine alias terms, based on user input. Additionally, or alternatively, client device 210 may determine default analysis technique(s) to perform. In some implementations, client device 210 may determine the analysis technique(s) to perform based on a characteristic of the text (e.g., a size of the text, contents included in the text, a type of document that includes the text, a file format of a file that includes the text, etc.).

The analysis technique(s) may include one or more syntactic analysis techniques and/or one or more semantic analysis techniques. The syntactic analysis techniques may include a misspelling analysis, a short form analysis, an explicit alias analysis, or the like. The semantic analysis techniques may include a latent semantic analysis, a tag-based analysis, a transitive analysis, a co-location analysis, a glossary analysis, or the like. Except as otherwise noted below, client device 210 may perform a single analysis technique, or may perform any combination of multiple analysis techniques. When performing a combination of multiple analysis techniques, client device 210 may perform the multiple analysis techniques in any order, except as otherwise noted below. In some implementations, an analysis technique may be performed by analyzing two terms at a time.

As further shown in FIG. 6, process 600 may include performing a misspelling analysis (block 610). For example, client device 210 may analyze two or more terms, included in the list of unique terms, to determine whether the terms are misspelled alias terms. In some implementations, client device 210 may use a language database, such as a dictionary, to determine whether the terms are misspelled alias terms. When a term is included in the language database, client device 210 may determine that the term is not a misspelled alias term. When at least one of the terms is not included in the language database, client device 210 may calculate an edit distance of the terms to determine whether the terms are misspelled alias terms.

Edit distance may refer to the smallest number of insertion, deletion, and/or substitution operations required to modify a first term to generate a second term. For example, the terms "environment" and "wenvironment" have an edit distance of one (e.g., an insertion of a single character "w" at the beginning the term "environment"). Similarly, the terms "environment" and "nvironment" have an edit distance of one (e.g., a deletion of a single character "e" at the beginning the term "environment"). As another example, the terms "environment" and "winvironment" have an edit distance of two (e.g., an insertion of "w" and a substitution of "e" with "i").

In some implementations, client device 210 may determine that terms are misspelled alias terms if the edit distance of the terms is less than a threshold value (e.g., 2) and/or equal to a threshold value (e.g., 1). Additionally, or alternatively, when client device 210 analyzes multi-word terms, client device 210 may determine that the multi-word terms are misspelled alias terms if the average edit distance of the words included in the multi-word terms is less than a threshold value (e.g., 1). When the terms include a different quantity of words, client device 210 may only consider corresponding words when calculating the average edit distance, in some implementations.

For example, consider two multi-word terms:

$u_1 = \{w_{11}, w_{12}, \ldots, w_{1n}\}$, and $u_2 = \{w_{21}, w_{22}, \ldots, w_{2m}\}$.

In the above terms $u_1$ and $u_2$, each $w_{ij}$ represents the j-th word of the i-th term, and $n \leq m$. Client device 210 may determine that the terms $u_1$ and $u_2$ are misspelled alias terms if the average edit distance $\beta_{avg}$ of the words in the terms is less than or equal to a threshold value (e.g., 1). Client device 210 may calculate the average edit distance $\beta_{avg}$ by summing the edit distances of each corresponding word $w_{1j}$ and $w_{2j}$, and then dividing by the total number of compared words n.

For example, consider two terms with three words each:

$u_1 = \{$Environmental Protection Agency$\}$, and $u_2 = \{$Envirnmental Protecton Agency$\}$.

In this example, the edit distance, $\beta_1$ for the first pair of corresponding words, $w_{11}$=Environmental and $w_{21}$=Envirnmental, is equal to 1 (e.g., deleting an "o" from "Environmental"). Similarly, the edit distance $\beta_2$ for the second pair of corresponding words, $w_{12}$=Protection and $w_{22}$=Protecton, is equal to 1 (e.g., deleting an "i" from "Protection"). Finally, the edit distance $\beta_3$ for the third pair of corresponding words, $w_{13}$=Agency and $w_{23}$=Agency, is equal to 0 (e.g., the words are identical). Thus, the average edit distance is equal to 2/3 (e.g., 0.66):

$\beta_{avg} = (\beta_1 + \beta_2 + \beta_3)/n$ $\beta_{avg} = (1+1+0)/3$ $\beta_{avg} = 2/3 = 0.66$.

Based on this calculation, client device 210 may determine that the terms {Environmental Protection Agency} and {Envirnmental Protecton Agency} are misspelled alias terms (e.g., since $\beta_{avg} \leq 1$).

Additionally, or alternatively, when the terms include a different number of words, client device 210 may compare the number of words in each term to determine whether the terms are misspelled alias terms. For example, client device 210 may determine the difference between the number of words in the terms (e.g., m−n), and may determine that the terms are possible misspelled alias terms when the difference is less than or equal to a threshold (e.g., 1). For example, consider the terms:

$u_1 = \{$Environmental Protection Agency$\}$, and $u_2 = \{$US Envirnmental Protecton Agency$\}$.

In the above example, the number of words n in $u_1$ is equal to 3 (e.g., n=3), and the number of words m in $u_2$ is equal to 4 (e.g., m=4). Client device 210 may determine that the difference between the number of terms in $u_1$ and $u_2$ satisfies a threshold (e.g., m−n≤1). Based on this determination, client device 210 may remove words from the larger term (e.g., $u_2$) that do not correspond to words in the smaller term (e.g., $u_1$), and may determine the average edit distance of the remaining words. For example, client device 210 may remove the word "US" from $u_2$, and may determine the average edit distance between {Environmental Protection Agency} and {Envirnmental Protecton Agency}, as described above.

If client device 210 determines that terms are misspelled alias terms, then client device 210 may set a misspelling similarity score equal to one. Conversely, if client device 210 determines that terms are not misspelled alias terms, then client device 210 may set the misspelling similarity score equal to zero. Alternatively, client device 210 may set the misspelling similarity score equal to the edit distance and/or the average edit distance.

As further shown in FIG. 6, process 600 may include performing a short form analysis (block 615). For example, client device 210 may analyze two or more terms, included in the list of unique terms, to determine whether the terms are short form alias terms (e.g., an acronym, an abbreviation, etc.). In some implementations, client device 210 may use a language database to determine whether the terms are short form alias terms. When a term is included in the language database, client device 210 may determine that the term is not a short form alias term. Alternatively, when a term is included in the language database, client device 210 may determine that the term is a possible short form alias term if the term appears in capital letters in the text (e.g., "ACT" being an acronym), and/or appears before a period in the text (e.g., "pot." being an abbreviation of potential).

Client device 210 may determine that two terms are short form alias terms by determining that a first term, SF, is shorter in length than the second term, LF (e.g., SF includes a smaller number of characters than LF), and/or by determining that SF and LF begin with the same character (e.g., the same letter). In some implementations, client device 210 may modify SF and/or LF by removing a period from SF and/or LF (e.g., "env. prot. agency" may be modified to "env prot agency").

In some implementations, client device 210 may determine that SF and LF are short form alias terms based on determining that SF is an acronym of LF. Client device 210 may determine that SF is an acronym of LF by determining that each letter in SF matches a corresponding first letter of each word in LF. For example, client device 210 may determine that "EPA" is a short form alias term of "Environmental Protection Agency" because each letter of "EPA" matches a corresponding first letter of each word in "Environmental Protection Agency." Additionally, or alternatively, client device 210 may determine that SF includes all capital letters before considering SF as a possible acronym. Additionally, or alternatively, client device 210 may determine that SF appears in the text enclosed by parentheses before considering SF as a possible acronym. Additionally, or alternatively, client device 210 may determine that SF appears in the text within a threshold number of words of LF before considering SF as a possible acronym (e.g., SF appears in parentheses immediately after LF in the text).

In some implementations, client device 210 may determine that SF and LF are short form alias terms based on determining that SF is a prefix of LF. Client device 210 may determine that SF is a prefix of LF by determining that a threshold number of letters at the beginning of SF match corresponding letters at the beginning of LF. For example, client device 210 may determine that "env" is a short form alias term of "environment" because the first three letters of "env" match the first three letters of "environment." Additionally, or alternatively, client device 210 may determine that SF ends with a period before considering SF as a possible prefix (e.g., an abbreviation).

When LF and/or SF is a multi-word term, client device 210 may determine that SF and LF are short form alias terms based on determining that multiple words in SF are prefixes of corresponding words in LF. Client device 210 may determine that SF is a short form alias term of LF based on a threshold number of words in SF (e.g., all of the words) being prefixes of corresponding words in LF. For example, client device 210 may determine that "env. prot. ag" is a short form alias term of "environmental protection agency" by determining that "env" is a prefix of "environmental," "prot" is a prefix of "protection," and "ag" is a prefix of "agency."

In some implementations, client device 210 may determine that SF and LF are short form alias terms based on determining that SF can be generated from LF by deleting characters from LF. For example, client device 210 may determine that "mtc" is a short form alias term of "matching" because the "mtc" can be generated from "matching" by deleting characters from "matching."

When LF and/or SF is a multi-word term, client device 210 may determine that SF and LF are not short form alias terms when a residual string, determined based on generating SF from LF by deleting characters from LF, includes a particular character, such as a space. The residual string may include a string of characters in LF that immediately follow the last matching character (e.g., the last matching character between LF and SF), up to and including the last character of LF. For example, assume that SF="pdef" and LF="period defined." The residual string of this example is "fined." This residual string does not include a space, so client device 210 may consider "pdef" and "period defined" as short form alias terms (e.g., based on being able to generate SF from LF by deleting characters from LF). As another example, assume that SF="web sit" and LF="web site exchange." The residual string of this example is "e exchange." This residual string includes a space, so client device 210 may not consider "web sit" and "web site exchange" as short form alias terms.

Client device 210 may use one or more of the above techniques to determine whether terms in the unique term list are short form alias terms. In some implementations, client device 210 may first determine whether SF is an acronym of LF. If client device 210 determines that SF is not an acronym of LF, client device 210 may then determine whether SF is a prefix of LF (or whether multiple words in SF are prefixes of corresponding words in LF). If client device 210 determines that SF is not a prefix or LF (or that multiple words in SF are not prefixes of corresponding words in LF), client device 210 may then determine whether SF can be generated from LF by deleting characters from LF. If client device 210 determines that SF can be generated from LF by deleting characters from LF, client device 210 may determine whether a residual string includes a particular character (e.g., a space). In performing the analysis in this manner, client device 210 may determine whether SF and LF are short form alias terms without being required to perform every analysis for each pair of terms SF and LF.

If client device 210 determines that terms are short form alias terms, then client device 210 may set a short form similarity score equal to one. Conversely, if client device 210 determines that terms are not short form alias terms, then client device 210 may set the short form similarity score equal to zero.

As further shown in FIG. 6, process 600 may include performing an explicit alias analysis (block 620). For example, client device 210 may analyze two or more terms, included in the list of unique terms, to determine whether the terms are explicit alias terms. In some implementations, client device 210 may determine whether the terms are explicit alias terms based on an alias character pattern, such as "is also known as." Client device 210 may receive information (e.g., from a user and/or from another device) that identifies one or more alias character patterns to use to determine whether terms are explicit alias terms. Example alias character patterns include: "aka," "also known as," "sometimes also known as," "generally also known as," "generally known as," "better known as," "will be referred to as," "will be referred to henceforth as," "also called," "also called as," "will be used instead of," "will be mentioned as," "written as," "will be written as," "is an alias of," etc.

Client device 210 may determine that two terms are explicit alias terms when an alias character pattern is included in the text in between the terms, and/or within a threshold number of words between the terms. For example, using the alias character pattern "also known as," client device 210 may determine that "hot dog" and "ballpark frank" are explicit alias terms, based on any of the following being included in the text:

A hot dog, also known as a ballpark frank . . . .
A hot dog is also known as a ballpark frank.
A hot dog may also be known as a ballpark frank.

As can be seen, additional words may appear before, after, and/or within the alias character pattern. Client device 210 may determine that the two terms are explicit alias terms based on the number of additional words, appearing before, after, and/or within the alias character pattern, satisfying a threshold (e.g., less than 3).

If client device 210 determines that terms are explicit alias terms, then client device 210 may set an explicit similarity score equal to one. Conversely, if client device 210 determines that terms are not explicit alias terms, then client device 210 may set the explicit similarity score equal to zero.

As further shown in FIG. 6, process 600 may include performing a latent semantic analysis (block 625). For example, client device 210 may perform a latent semantic analysis on one or more pairs of terms, included in the list of unique terms, by generating a term occurrence matrix, merging rows in the matrix, adjusting values in the merged rows based on a term frequency-inverse document frequency (tf-idf) weighting factor, generating a low-rank approximation of the occurrence matrix with the adjusted values, and determining a latent semantic similarity score for a pair of terms using the low-rank approximation, as described below.

Client device 210 may generate a term occurrence matrix C of size t×d (e.g., with t rows and d columns), where t is equal to the number of unique terms in the list of unique terms (e.g., where unique term list T=[$term_1$, $term_2$, . . . , $term_t$]), and where d is equal to the number of text sections in the text (e.g., where the list of text sections D=[$Sec_1$, $Sec_2$, . . . , $Sec_d$]). The term occurrence matrix C may store an indication of a quantity of times that each term appears in each text section. For example, a value stored at C[i, j] may represent a quantity of times that the i-th term (e.g., term) is included in the j-th text section (e.g., $Sec_j$). A single row in occurrence matrix C represents a frequency of occurrence of a single term in each text section. A single column in occurrence matrix C represents the frequency of occurrence of each term, included in the list of unique terms T, in a single text section. Each row in occurrence matrix C may be referred to as a term vector, and each column in occurrence matrix C may be referred to as a text section vector.

In some implementations, client device 210 may merge two or more rows (e.g., term vectors) in matrix C. Client device 210 may merge rows by summing values in the rows that correspond to the same column (e.g., text section vector). For example, client device 210 may merge a first row and a second row by summing the first value in the first row and the first value in the second row, by summing the second value in the first row and the second value in the second row, by summing the j-th value in the first row and the j-th value in the second row, etc. The summed values may be represented in a single row (e.g., a single term vector), and may be associated with one or more of the terms associated with the merged rows.

Client device 210 may merge rows based on a syntactic analysis and/or a semantic analysis of the terms associated with the rows. For example, client device 210 may merge rows based on determining that the terms associated with the rows are misspelled alias terms, short form alias terms, explicit alias terms, etc. Additionally, or alternatively, client device 210 may merge rows based on determining that an alias score for a semantic analysis technique (e.g., a technique other than latent semantic analysis, such as tag-based analysis, transitive analysis, co-location analysis, glossary analysis, etc.) satisfies a threshold.

In some implementations, client device 210 may adjust values in the merged rows based on a tf-idf weighting factor. Client device 210 may determine the tf-idf weighting factor by multiplying a term frequency (tf) factor and an inverse document frequency (idf) factor. In some implementations, client device 210 may determine the tf factor corresponding to a particular term (e.g., row) and text section (e.g., column) based on the number of occurrences of the term in the text section. In other words:

$$tf(term_i, Sec_j) = C[i,j],$$

for each i in t and each j in d.

Alternatively, client device 210 may use other techniques to determine the tf factor.

In some implementations, client device 210 may determine the idf factor corresponding to a particular term (e.g., row) and text section (e.g., column) based on the total number of text sections d and the number of text sections in which the term appears. For example, client device 210 may determine the idf factor for a particular term and text section by dividing the total number of text sections d by the number of text sections in which the term appears, and by taking a logarithm of that quotient. In some implementations, client device 210 may determine the idf factor as follows:

$$idf(term_i, Sec_j) = \ln\left(\frac{d}{n_i + 1}\right),$$

for each i in t and each j in d.

In the above equation, d represents the total number of text sections, and $n_i$ represents the number of text sections that include $term_i$.

Client device 210 may calculate the tf-idf factor by multiplying the tf factor and the idf factor. For example:

$$tf\text{-}idf(term_i, Sec_j) = C[i,j] \times \ln\left(\frac{d}{n_i + 1}\right).$$

Client device 210 may replace values in the occurrence matrix with values of the corresponding tf-idf factor. For example:

$$C[i,j] = C[i,j] \times \ln\left(\frac{d}{n_i + 1}\right).$$

In some implementations, client device 210 may generate a low-rank approximation of the occurrence matrix with the adjusted values. Client device 210 may apply singular value decomposition (SVD) to occurrence matrix C, to determine matrices U, Σ, and $V^T$, such that:

$$C = U\Sigma V^T,$$

where C is the occurrence matrix (e.g., with or without the merged rows and/or with or without the adjusted values), U is a t×t unitary matrix, Σ is a t×d rectangular diagonal matrix with nonnegative real numbers on the diagonal, and where $V^T$ (the conjugate transpose of V) is a d×d unitary matrix. The diagonal values of (e.g., $\Sigma_{i,i}$) may be referred to as the singular values of C.

Client device 210 may determine a truncation value k for reducing the size of matrix U, which may be useful for calculating a latent semantic similarity score for two terms. Client device 210 may determine the number of non-zero singular values (e.g., the number of non-zero entries in Σ), which may be referred to as the rank r of C, and may set the truncation value k equal to the rank r of C. Alternatively, client device 210 may set the truncation value k equal to $(t \times d)^{0.2}$. In some implementations, client device 210 may set the truncation value k as follows:

If $(t \times d)^{0.2} < r$, then $k = (t \times d)^{0.2}$,

Otherwise, k=r.

Client device 210 may truncate the matrix U by deleting columns from U that are not included in the first k columns (e.g., the truncated matrix U may only includes columns 1 through k of the original matrix U). The rows in truncated matrix U correspond to term vectors in the latent semantic indexing (LSI) space.

Client device 210 may calculate a latent semantic similarity score for each pair of terms $u_1$, $u_2$ included in the list of unique terms. The latent semantic similarity score may be calculated as the cosine of the angular distance between the term vectors $U[u_1]$ and $U[u_2]$, and may be calculated as follows:

$$LsiScore[u_1, u_2] = \frac{\sum_{l=1}^{l=k} U[u_1, l] U[u_2, l]}{\sqrt{\sum_{l=1}^{l=k} U[u_1, l]^2} \sqrt{\sum_{l=1}^{l=k} U[u_2, l]^2}},$$

where $u_1$ is a first term in the list of unique terms, $u_2$ is a second term in the list of unique terms, and U is the truncated matrix U. Alternatively, in some implementations U may not be truncated. The LsiScore may range from [−1, 1], where −1 indicates that the terms are antonyms, 0 indicates that the terms are statistically independent, and 1 indicates that the terms are synonyms.

As further shown in FIG. 6, process 600 may include performing a tag-based analysis (block 630). For example, client device 210 may perform a tag-based analysis on one or more pairs of terms, included in the list of unique terms, based on the tags used to tag terms in the text, and based on a tag compatibility matrix. In some implementations, client device 210 may receive the tag compatibility matrix based on user input. The tag compatibility matrix may identify, for each tag in a list of tags Z used to tag terms in the text, a set of tags that are compatible with the tag. Tags that are compatible with one another may be referred to as compatible tags. As an example, the tag compatibility matrix may identify the following compatible tags:

| Tag | Compatible Tags |
|---|---|
| NN | NNS, NNP, NNPS |
| VB | VBD, VBN, VBG, VBP, VGZ |
| RB | RBR, RBS |
| JJ | JJR, JJS |
| ENTITY | NN, PROCESS |

Additionally, or alternatively, the tag compatibility matrix may identify incompatible tags. The above tag compatibility matrix indicates that nouns are compatible with other nouns (e.g., NN, NNS, NNP, NNPS), verbs are compatible with other verbs (e.g., VB, VBD, VBN, VBG, VBP, VGZ), adverbs are compatible with other adverbs (e.g., RB, RBR, RBS), adjectives are compatible with other adjectives (e.g., JJ, BR, BS), and entity tags are compatible with noun tags and process tags. If a first tag is compatible with a second tag, then the second tag may be compatible with the first tag. In some implementations, the first tag may also be compatible with all of the tags that are compatible with the second tag.

Example part-of-speech tags include NN (noun, singular or mass), NNS (noun, plural), NNP (proper noun, singular), NNPS (proper noun, plural), VB (verb, base form), VBD (verb, past tense), VBG (verb, gerund or present participle), VBP (verb, non-third person singular present tense), VGZ (verb, third person singular present tense), VBN (verb, past participle), RB (adverb), RBR (adverb, comparative), RBS (adverb, superlative), JJ (adjective), BR (adverb, comparative), BS (adjective, superlative), etc.

Client device 210 may generate a tag count matrix W of size t×z (e.g., with t rows and z columns), where t is equal to the number of unique terms in the list of unique terms T, and where z is equal to the number of tags in the tag list Z used to tag terms in the text (e.g., where the tag list Z=[$Tag_1$, $Tag_2$, ..., $Tag_z$]). The tag count matrix W may store an indication of a quantity of times that each term is associated with each tag (e.g., throughout the text). For example, a value stored at w[i,j] may represent a quantity of times that the i-th term (e.g., $term_i$) is associated with the j-th tag (e.g., Tag). A single row in tag count matrix W represents a frequency of associations between a single term and each tag. A single column in tag count matrix W represents a frequency of associations between each term, included in the list of unique terms T, and a single tag. Each row in tag count matrix W may be referred to as a term vector, and each column in tag count matrix W may be referred to as a tag vector.

In some implementations, client device 210 may merge two or more columns (e.g., tag vectors) in matrix W. Client device 210 may merge columns by summing values in the columns that correspond to the same row (e.g., term vector). For example, client device 210 may merge a first column and a second column by summing the first value in the first column and the first value in the second column, by summing the second value in the first column and the second value in the second column, by summing the i-th value in the first column and the i-th value in the second column, etc. The summed values may be represented in a single column (e.g., a single tag vector), and may be associated with one or more of the tags associated with the merged columns.

Client device 210 may merge columns based on the tag compatibility matrix. For example, client device 210 may merge columns corresponding to compatible tags. Client device 210 may update the values of W and z based on merging the columns. For example, client device 210 may set the value of z to equal the number of incompatible tags in the tag list Z, and may update the size of matrix W based on the new value of z.

Client device 210 may calculate a tag-based similarity score for each pair of terms $u_1$, $u_2$ included in the list of unique terms. When each term in the pair $u_1$, $u_2$ is associated with a single tag, client device 210 may calculate the tag-based similarity score as follows:

TagScore[$u_1$,$u_2$]=1, if the tags of $u_1$ and $u_2$ are compatible, or

TagScore[$u_1$,$u_2$]=0, if the tags of $u_1$ and $u_2$ are incompatible.

When at least one of the terms in the pair $u_1$, $u_2$ is associated with more than one tag, client device 210 may calculate the tag-based similarity score as follows:

$$TagScore[u_1, u_2] = \frac{\sum_{r=1}^{r=z} \min\{W[u_1, r], W[u_2, r]\}}{\sum_{r=1}^{r=z} \max\{W[u_1, r], W[u_2, r]\}}$$

where $u_1$ is a first term in the list of unique terms, $u_2$ is a second term in the list of unique terms, z is the number of incompatible tags in tag list Z, and W is the merged matrix W. Alternatively, in some implementations z is the total number of tags in tag list Z, and W is the un-merged matrix W.

As further shown in FIG. 6, process 600 may include performing a transitive analysis (block 635). For example, client device 210 may perform a transitive analysis on one or more pairs of terms, included in the list of unique terms, based on the latent semantic analysis and the tag-based analysis. In some implementations, the transitive analysis for a pair of terms $u_1$ and $u_2$ may be based on a tag-based similarity score between neighbor terms of $u_1$ and $u_2$, where the neighbor terms of $u_1$ may be designated $v_1$, and the neighbor terms of $u_2$ may be designated $v_2$. A neighbor term may be determined based on a latent semantic similarity score between the term u and the neighbor term v. Additionally, or alternatively, a neighbor term may be determined based on a proximity of the neighbor term v to the term u (e.g., a proximity within the text, such as adjacent terms in the text, terms within a threshold distance of one another in the text, etc.)

Client device 210 may determine that a first term v is a neighbor term of a term u by determining that the latent semantic similarity score between u and v satisfies a threshold. For example, v may be a neighbor term of u when:

LsiScore[u,v]<ε, where ξ is a threshold value, such as 0.1.

Client device 210 may calculate a transitive similarity score for each pair of terms $u_1$, $u_2$ included in the list of unique terms, as follows:

$$TransScore[u_1, u_2] = \frac{\sum_{(v_1, v_2) \in (L_1, L_2)} TagSim[v_1, v_2]}{L},$$

where $u_1$ is a first term in the list of unique terms, $u_2$ is a second term in the list of unique terms, $v_1$ is a neighbor term of term $u_1$, $v_2$ is a neighbor term of term $u_2$, $L_1$ is a list of neighbor terms of $u_1$ (e.g., $v_1$ is included in $L_1$), $L_2$ is a list of neighbor terms of $u_2$ (e.g., $v_2$ is included in $L_2$), and $L=|L_1 \times L_2|$, and is based on the number of terms included in $L_1$ and the number of terms included in $L_2$ (e.g., a sum of the number of terms, a multiplication of the number of terms, etc.)

As further shown in FIG. 6, process 600 may include performing a co-location analysis (block 640). For example, client device 210 may perform a co-location analysis on one or more pairs of terms, included in the list of unique terms, based on how closely the terms appear in the text. In some implementations, terms that appear near one another in the text may not be alias terms (e.g., unless the terms are explicit alias terms), as an author of the text is unlikely to use two different terms for the same entity in sections of the text that are located near one another.

Client device 210 may calculate a co-location similarity score for each pair of terms $u_1$, $u_2$ included in the list of unique terms, based on the list of text sections D (e.g., an ordered and/or consecutive list of text sections in the text). In some implementations, client device 210 may set the co-location similarity score $CoLocScore[u_1,u_2]$ equal to zero based on determining that $u_1$ occurs in a first text section $Sec_m$ and $u_2$ occurs in a second text section $Sec_n$, where the distance between m and n satisfies a threshold (e.g., $|m-n|<5$). Conversely, client device 210 may set the co-location similarity score $CoLocScore[u_1,u_2]$ equal to one based on determining that $u_1$ and $u_2$ do not occur in text sections $Sec_m$ and $Sec_n$ within the threshold distance.

As further shown in FIG. 6, process 600 may include performing a glossary analysis (block 645). For example, client device 210 may perform a glossary analysis on one or more pairs of terms, included in the list of unique terms, based on receiving a glossary (e.g., based on user input and/or from another device). In some implementations, the glossary may include an initial glossary (e.g., discussed elsewhere herein), a final glossary (e.g., discussed elsewhere herein), a language database (e.g., a synonym database), etc. In some implementations, client device 210 may determine a glossary similarity score based on determining whether one or more of the terms are included in the glossary.

As an example, if a pair of terms $u_1$, $u_2$ are identified as synonyms in the glossary, then client device 210 may set the glossary similarity score $GlossaryScore[u_1,u_2]$ equal to one. Conversely, if the terms $u_1$, $u_2$ are included in the glossary, and are not identified as synonyms in the glossary, then client device 210 may set the glossary similarity score $GlossaryScore[u_1,u_2]$ equal to zero.

As another example, assume that only one of the terms $u_1$ is in the glossary (e.g., $u_2$ is not in the glossary), and the glossary identifies a tag for $u_1$. If the identified tag is incompatible with the tag of $u_2$, then client device 210 may set the $GlossaryScore[u_1,u_2]$ equal to zero. If the identified tag is compatible with the tag of $u_2$, then client device 210 may set $GlossaryScore[u_1,u_2]$ equal to one. Alternatively, if the identified tag is compatible with the tag of $u_2$, then client device 210 may determine a list of synonyms S of $u_1$, based on an identification of synonyms of $u_1$ included in the glossary, and may set $GlossaryScore[u_1,u_2]$ equal to the average latent semantic index (LSI) distance between $u_1$ and the terms in S.

When only one of the terms is in the glossary and the glossary does not identify a tag for the included term, and/or when both of the terms are not in the glossary, then client device 210 may set $GlossaryScore[u_1,u_2]$ equal to TransScore $[u_1,u_2]$. Alternatively, client device 210 may not include GlossaryScore$[u_1,u_2]$ in a calculation of an overall alias score.

As further shown in FIG. 6, process 600 may include determining one or more alias scores for each pair of terms, based on the determined analysis techniques (block 650), and determining an overall alias score, for each pair of terms, based on the determined alias scores (block 655). For example, client device 210 may determine an alias score for one or more of the performed analysis techniques. The alias score may include, for example, the misspelling similarity score, the short form similarity score, the explicit similarity score, the latent semantic similarity score, the tag-based similarity score, the transitive similarity score, the co-location similarity score, and/or the glossary similarity score. The determined alias scores may depend on the determined analysis techniques.

Client device 210 may determine an overall alias score, for each pair of terms, based on the one or more alias scores. In some implementations, the overall alias score may include a single type of alias score, such as the misspelling similarity score, the short form similarity score, the explicit similarity score, the latent semantic similarity score, the tag-based similarity score, the transitive similarity score, the co-location similarity score, or the glossary similarity score.

In some implementations, an overall alias score of one may indicate that the terms, associated with the overall alias score, are alias terms. In some implementations, an overall alias score of zero may indicate that the terms, associated with the overall alias score, are not alias terms. In some implementations, an overall alias score that satisfies a threshold (e.g., greater than 0.5) may indicate that the terms, associated with the overall alias score, are alias terms. In some implementations, an overall alias score that does not satisfy a threshold (e.g., is less than 0.5) may indicate that the terms, associated with the overall alias score, are not alias terms.

As an example, if the latent semantic similarity score (e.g., LsiScore) is equal to zero, if the co-location similarity score (e.g., CoLocScore) is equal to zero, if the glossary similarity score (e.g., GlossaryScore) is equal to zero, if the short form alias score is equal to zero (e.g., if both terms are single-word terms included in a language database) and/or if any other type of alias score is equal to zero, client device 210 may set the overall alias score OverallScore equal to zero. In some implementations, if the glossary similarity score (e.g., GlossaryScore) and/or any other type of alias score is equal to one, client device 210 may set the overall alias score OverallScore equal to one.

In some implementations, the overall alias score may be based on any combination of different types of alias scores. In some implementations, client device 210 may weigh one or more of the different types of alias scores, using the same weight for two or more alias scores, and/or using different weights for different alias scores (e.g., based on user input). In some implementations, a weight may be a coefficient that is multiplied with an alias score. In some implementations, client device 210 may generate the weights in a manner such that the sum of the weights is equal to a particular value (e.g., 1, 100, etc.).

As an example, client device 210 may calculate the overall alias score as follows:

OverallScore[$u_1,u_2$]=$\alpha_1$LsiScore[$u_1,u_2$]+$\alpha_2$TransScore[$u_1,u_2$]+$\alpha_3$TagScore[$u_1,u_2$]+$\alpha_4$CoLocScore[$u_1,u_2$], where $\alpha_1+\alpha_2+\alpha_3+\alpha_4=1$. In some implementations, each weight (e.g., each $\alpha$) may be equal (e.g., 0.25+0.25+0.25+0.25=1). Alternatively, each weight may be different (e.g., 0.1+0.2+0.3+0.4=1). Alternatively, some weights may be equal and some may be different (e.g., 0.25+0.25+0.2+0.3=1).

As further shown in FIG. 6, process 600 may include determining alias terms based on the overall alias score (block 660). For example, client device 210 may determine alias terms based on the overall alias score. In some implementations, client device 210 may determine that two terms are alias terms when the overall alias score OverallScore satisfies a threshold (e.g., 0, 0.5, 1, etc.). For example, client device 210 may determine that terms to and $u_2$ are alias terms when OverallScore[$u_1,u_2$]>0. In some implementations, client device 210 may add alias terms to the glossary (e.g., the initial glossary, the final glossary). Additionally, or alternatively, client device 210 may further process determined alias terms to determine incorrect alias terms (e.g., via user input and/or via a term elimination technique described herein in connection with FIG. 7). Client device 210 may remove the incorrect alias terms from the glossary. Additionally, or alternatively, client device 210 may receive user input to determine additional alias terms, as described herein in connection with FIGS. 8A and 8B.

While a series of blocks has been described with regard to FIG. 6, the blocks and/or the order of the blocks may be modified in some implementations. Additionally, or alternatively, non-dependent blocks may be performed in parallel.

Figure 7:
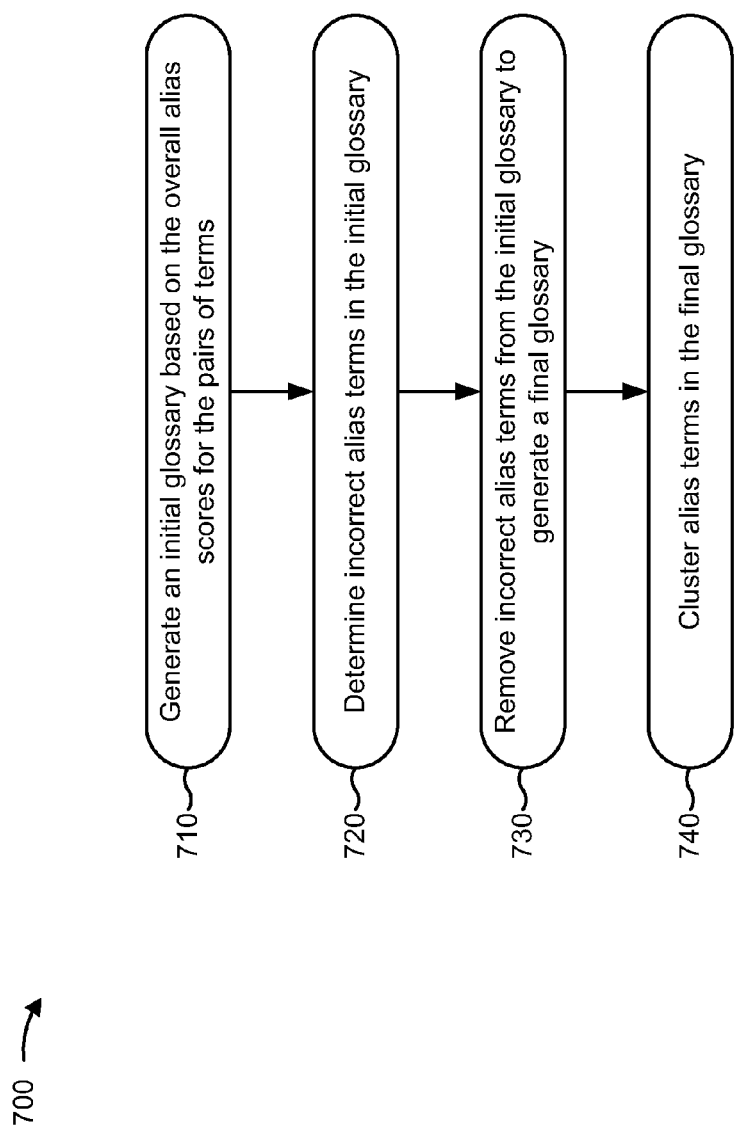
FIG. 7 is a flow chart of an example process for removing incorrect alias terms from a glossary of alias terms.

FIG. 7 is a flow chart of an example process 700 for removing incorrect alias terms from a glossary of alias terms. In some implementations, process 700 may correspond to process block 460. In some implementations, one or more process blocks of FIG. 7 may be performed by client device 210. In some implementations, one or more process blocks of FIG. 7 may be performed by another device or a group of devices separate from or including client device 210, such as server device 220.

As shown in FIG. 7, process 700 may include generating an initial glossary based on the overall alias scores for the pairs of terms (block 710), and determining incorrect alias terms in the initial glossary (block 720). For example, client device 210 may generate the initial glossary based on overall alias scores associated with pairs of terms (e.g., where OverallScore[$u_1,u_2$]>0), as described elsewhere herein. In some implementations, client device 210 may receive user input to determine incorrect alias terms in the initial glossary. For example, client device 210 may provide a representation of the initial glossary via a user interface, and may receive a user indication of incorrect alias terms. Additionally, or alternatively, client device 210 may receive a user indication of additional alias terms to include in a final glossary and/or a modification of alias terms in the initial glossary.

In some implementations, client device 210 may determine incorrect alias terms based on a term elimination technique that utilizes a language database. The language database may include, for example, an indication of sets of words that are synonyms of one another (e.g., synsets). Client device 210 may receive the initial glossary Ψ, which may include a list of term pairs $u_1$, $u_2$ where OverallScore[$u_1,u_2$]>0. Client device 210 may use the language database to compare pairs of terms $u_1$, $u_2$ where at least one of the terms is a multi-word term. For example, client device 210 may compare terms $u_1$ and $u_2$:

$u_1=\{w_{11},w_{12},\ldots,w_{1n}\}$ $u_2=\{w_{21},w_{22},\ldots,w_{2m}\}$, where $w_{ij}$ represents the j-th word in the i-th term, and where n+m>2 (e.g., at least one of the terms is a multi-word term).

If none of the words $w_{ij}$ in either term are included in the language database, client device 210 may maintain the terms in the initial glossary Ψ (e.g., may not remove the terms from Ψ). Otherwise, client device 210 may determine lists of synonyms for each word of $u_1$ and $u_2$. Client device 210 may compare a synonym list for each of the words, included in the language database, of the first term with a synonym list of each of the words, included in the language database, of the second term (e.g., may compare a synonym list of $w_{11}$ with a synonym list of $w_{21}$, a synonym list of $w_{22}$, ..., a synonym list of $w_{2m}$; may compare a synonym list of $w_{12}$ with a synonym list of $w_{21}$, a synonym list of $w_{22}$, ..., a synonym list of $w_{2m}$; etc.; there will be n×m comparisons when all of the words are included in the language database).

Client device 210 may determine a synonym score s for the pair of terms. In some implementations, the synonym score s may be based on a quantity of times that at least one synonym of a word in the first term $u_1$ matches a synonym of a word (or the word itself) in the second term $u_2$. For example, the synonym score s may include a quantity of times that a synonym set of a word in the first term $u_1$ shares a word with (e.g., overlaps with) a synonym set of a word in the second term $u_2$. In some implementations, a synonym set of a word may include the word. As another example, the synonym score s may include a quantity of shared synonyms between words in the first term $u_1$ and words in the second term $u_2$. In some implementations, client device 210 may adjust the synonym score to generate a new synonym score as follows:

$\gamma=(2\times s)/(n+m)$.

Client device 210 may compare the synonym score (e.g., $\gamma$ or s) to a glossary threshold $\delta$. In some implementations, client device 210 may determine the glossary threshold $\delta$ based on user input. Additionally, or alternatively, client device 210 may determine the glossary threshold $\delta$ based on characteristics of the terms $u_1$ and/or $u_2$.

In some implementations, client device 210 may determine the glossary threshold $\delta$ based on a quantity of words of the first and/or second term that are included in the language database. As an example, assume that the first term $u_1$ includes a single word $w_1$, and the second term $u_2$ includes two or more words $w_2, w_3, \ldots, w_m$. If the single word $w_1$ of $u_1$ to is included in the language database, client device 210 may set the glossary threshold $\delta$ to a first value (e.g., 1). If the single word $w_1$ of $u_1$ is not included in the language database, client device 210 may set the glossary threshold $\delta$ to a second value (e.g., 0).

Alternatively, if the single word $w_1$ of the first term $u_1$ is not included in the language database, client device 210 may set the glossary threshold $\delta$ based on a quantity of words of the second term $u_2$ included in the language database. For example, if two or more of the words (e.g., if all of the words) of the second term $u_2$ are included in the language database, then client device 210 may set the glossary threshold $\delta$ to the first value (e.g., 1). Otherwise, if fewer than two of the words of the second term $u_2$ are included in the language database, then client device 210 may set the glossary threshold $\delta$ to the second value (e.g., 0).

In some implementations, client device 210 may determine a quantity of words (e.g., a quantity of unique words) included in both terms (e.g., m+n), and may determine the glossary threshold $\delta$ based on the quantity of words included in both terms. For example, client device 210 may set the glossary threshold $\delta$ to the first value (e.g., 1) if a quantity or percentage of the words included in the language database satisfies a threshold (e.g., 4 out of 5 terms included in the database, where the threshold of 4 is determined by m+n−1). Otherwise, if the quantity or percentage of words included in the language database does not satisfy the threshold, then client device 210 may set the glossary threshold δ to the second value (e.g., 0).

In some implementations, client device 210 may determine a quantity of shared words included in both terms (e.g., a quantity of words included in the first term and also included in the second term), and may determine the glossary threshold δ based on the quantity of shared words. For example, if all of the words of the first term are included in the second term, then client device 210 may set the glossary threshold δ to the second value (e.g., 0). Alternatively, if the quantity of shared words satisfies a threshold (e.g., n−1), then client device 210 may set the glossary threshold δ to the second value (e.g., 0). Otherwise, if the quantity of shared words does not satisfy the threshold, then client device 210 may set the glossary threshold δ to the first value (e.g., 1).

In some implementations, setting the glossary threshold δ to the first value (e.g., 1) may cause client device 210 to eliminate the terms being analyzed from the initial glossary. Conversely, setting the glossary threshold δ to the second value (e.g., 0) may cause client device 210 to maintain the terms being analyzed in the initial glossary.

Once client device 210 has determined the glossary threshold δ, client device 210 may compare the synonym score (e.g., γ or s) to the glossary threshold δ. Based on whether the synonym score, associated with a pair of terms, satisfies the glossary threshold δ, client device 210 may maintain or remove the pair of terms from the initial glossary. For example, if the synonym score is less than the glossary threshold, then client device 210 may remove the pair of terms from the initial glossary Ψ.

As an example, assume that client device 210 has set the glossary threshold δ=⅔. Further assume that $u_1$={US Environmental Protection Agency} and $u_2$={Climate Safeguard Bureau}. Assume that in the language dictionary, the following pairs of terms are determined to be synonyms: {Environmental, Climate}, {Protection, Safeguard}, and {Agency, Bureau}. Based on determining these three matches, client device 210 may set the synonym score s=3. Client device 210 may calculate a new synonym score γ=(2×s)/(n+m)=6/7. Because 6/7>⅔, client device 210 may maintain $u_1$ and $u_2$ in the initial glossary Ψ.

As further shown in FIG. 7, process 700 may include removing incorrect alias terms from the initial glossary to generate a final glossary (block 730). For example, client device 210 may remove incorrect alias terms from the initial glossary Ψ, based on user input and/or the term elimination technique, to generate a final glossary $Ψ_f$. In some implementations, client device 210 may rank remaining pairs of terms in the initial glossary Ψ, and may include a particular percentage and/or quantity of the top-ranked remaining pairs in the final glossary $Ψ_f$.

As further shown in FIG. 7, process 700 may include clustering alias terms in the final glossary (block 740). For example, client device 210 may cluster groups of terms, included in the final glossary $Ψ_f$, that are determined to be alias terms. In some implementations, client device 210 may generate an undirected graph such that terms included in the final glossary $Ψ_f$ represent vertices of the undirected graph, and edges between terms in the undirected graph exist for terms where the overall alias score for the terms is greater than zero. Client device 210 may associate a weight with an edge that connects terms in the undirected graph, where the weight is equal to the value of the overall alias scores associated with the terms. Client device 210 may apply a graph clustering technique to the generated undirected graph to partition the terms into clusters of alias terms, such that terms within a first cluster are more similar to one another as compared to terms within other clusters.

Figure 8A:
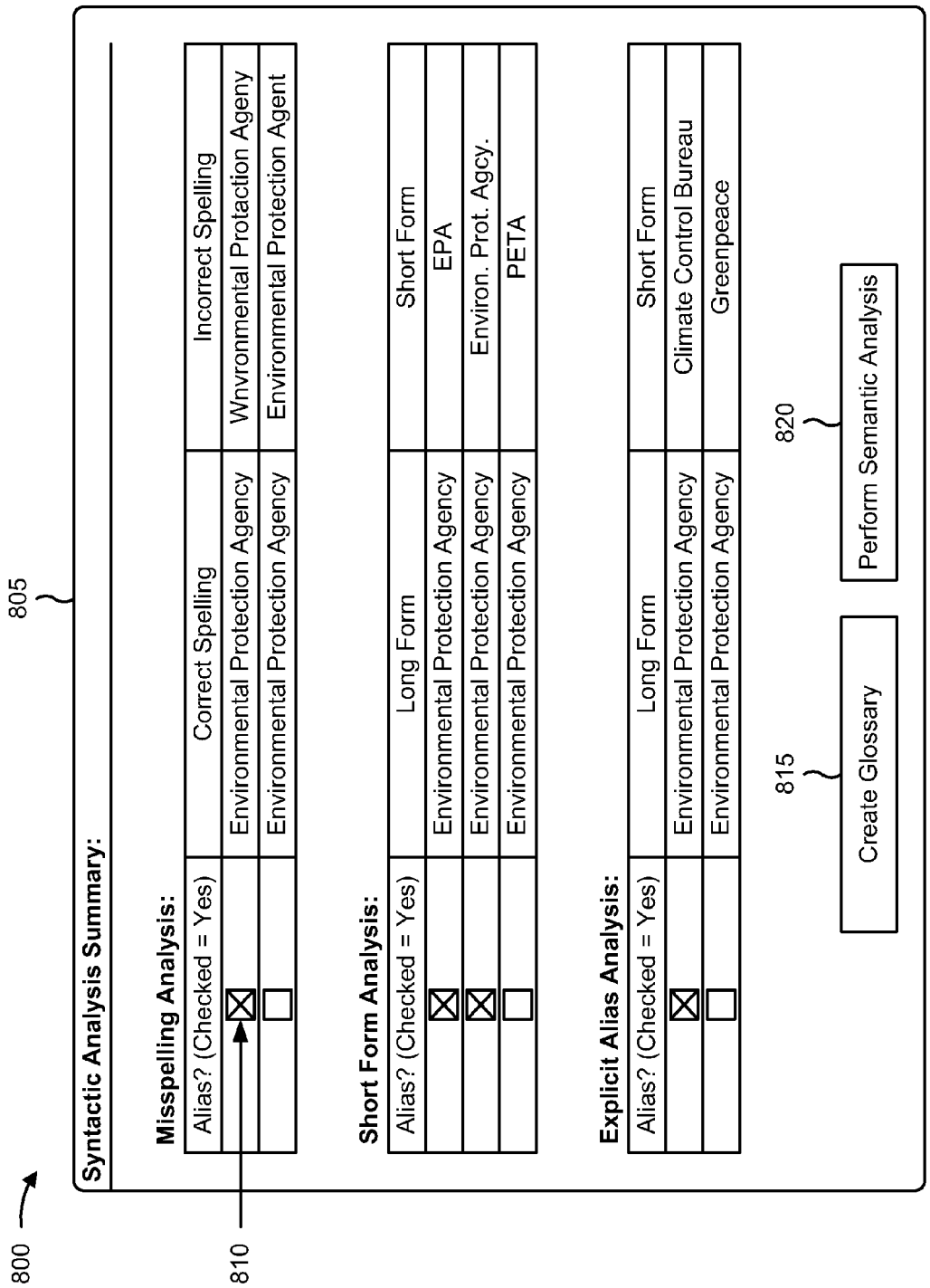
FIGS. 8A and 8B are diagrams of an example implementation relating to the example process shown in FIG. 7.
Figure 8B:
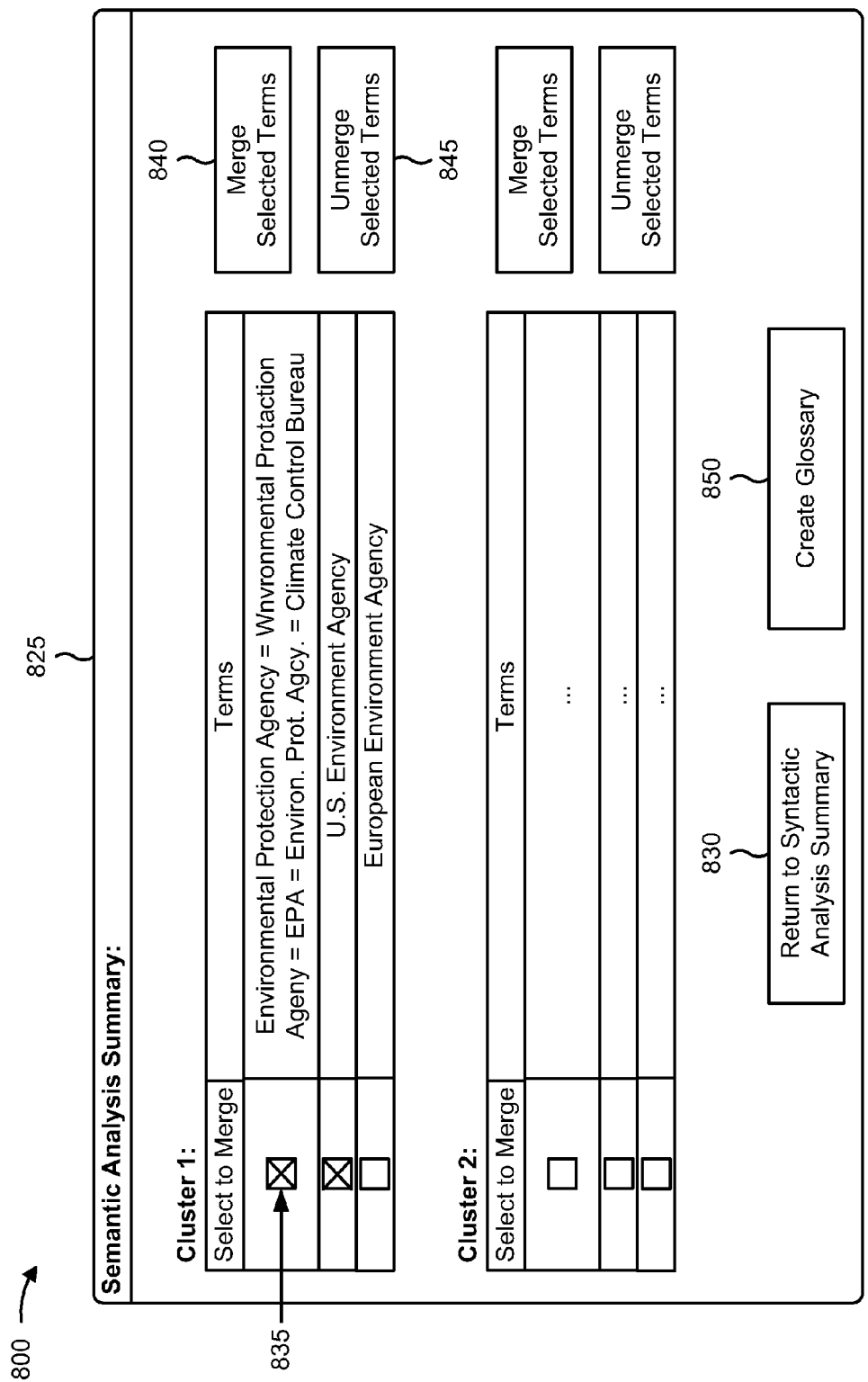

FIGS. 8A and 8B are diagrams of an example implementation 800 relating to example process 700 shown in FIG. 7. FIGS. 8A and 8B show an example of generating a final glossary based on user input.

As shown in FIG. 8A, client device 210 may provide a user interface 805 that provides a syntactic analysis summary, and that allows a user to edit alias terms determined using syntactic analysis technique(s) (e.g., following blocks 610, 615, and/or 620 of FIG. 6). In example implementation 800, assume that client device 210 has performed a misspelling analysis, a short form analysis, and an explicit alias analysis, and the results of these analyses have been provided via user interface 805. User interface 805 may provide, for example, an identification of each pair of terms determined to be alias terms based on the syntactic analysis.

As shown by reference number 810, user interface 805 may provide a mechanism (e.g., a checkbox) for a user to indicate whether two terms are alias terms. In some implementations, all of the boxes may be checked by default (e.g., when user interface 805 is first displayed), and the user may uncheck boxes associated with terms that are not alias terms (e.g., "Environmental Protection Agency" and "Environment Protection Agent"). Alternatively, none of the boxes may be checked by default, and the user may check boxes associated with terms that are alias terms (e.g., "Environmental Protection Agency" and "EPA"). Alternatively, boxes associated with terms having an alias score that satisfies a first threshold (e.g., greater than 0.5) may be checked by default, and boxes associated with terms having an alias score that satisfies a second threshold (e.g., greater than 0, but less than 0.5) may be unchecked by default.

In some implementations, client device 210 may determine that a particular term is a potential alias term of multiple other terms. For example, client device 210 may determine that "EPA" is a potential short form alias of "Environmental Protection Agency" and "ending pattern appendix." Client device 210 may prompt the user, via user interface 805, to select one of the long form terms as an alias term of the short form term.

Once the user has finished indicating whether terms are alias terms or not, the user may interact with input mechanism 815 (e.g., a "Create Glossary" button) to create a glossary based on the user indications. For example, terms associated with checked boxes may be added to the glossary as alias terms, and terms associated with unchecked boxes may not be added to the glossary as alias terms. Alternatively, the user may interact with input mechanism 820 (e.g., a "Perform Semantic Analysis" button), which may cause client device 210 to perform a semantic analysis (e.g., one or more of blocks 625-645 in FIG. 6).

In some implementations, the user indications may be incorporated into the semantic analysis. For example, in the latent semantic analysis, client device 210 may merge rows associated with alias terms indicated by the user. Additionally, or alternatively, the user indications may be incorporated into a calculation of the overall alias score. For example, the overall score for a pair of terms may be set to a particular value (e.g., 1), based on a user indication that the terms are alias terms.

As shown in FIG. 8B, client device 210 may provide a user interface 825 that provides a semantic analysis summary, and that allows a user to edit alias terms determined using semantic analysis technique(s), one or more alias scores, and/or an overall alias score (e.g., following any one or more of blocks 625-660 of FIG. 6). In example implementation 800, assume that client device 210 has performed one or more semantic analysis techniques to determine overall alias scores for pairs of terms, and the results of these analyses have been provided via user interface 825. User interface 825 may provide, for example, an identification of clusters of terms determined to be alias terms, based on overall alias scores associated with the terms. Client device 210 may determine the clusters as described herein in connection with FIG. 7.

As shown, terms that have been indicated as alias terms via user interface 805 (FIG. 8A) may be shown as alias terms on user interface 825 (e.g., "Environmental Protection Agency=Wnvronmental Protaction Ageny=EPA= . . . "). As shown by reference number 830, user interface 825 may provide a mechanism for a user to return to user interface 805 to edit the indicated alias terms. User interface 825 may provide additional terms, determined by client device 210 to be alias terms based on a semantic analysis. The additional terms may be listed separately in the cluster, and a user may be given the option to indicate that an additional term is an alias term of one or more other terms in the cluster.

As shown by reference number 835, user interface 825 may provide a mechanism (e.g., a checkbox) for a user to indicate whether two terms (or groups of terms) are alias terms. In some implementations, all of the boxes may be checked by default (e.g., when user interface 825 is first displayed), and the user may uncheck boxes associated with terms that are not alias terms (e.g., "U.S. Environment Agency" and "European Environment Agency"). Alternatively, none of the boxes may be checked by default, and the user may check boxes associated with terms that are alias terms (e.g., "Environmental Protection Agency=Wnvronmental Protaction Agency=EPA= . . . " and "U.S. Environment Agency"). Alternatively, boxes associated with terms having an overall alias score that satisfies a first threshold (e.g., greater than 0.5) may be checked by default, and boxes associated with terms having an overall alias score that satisfies a second threshold (e.g., greater than 0, but less than 0.5) may be unchecked by default.

In some implementations, a user may indicate that two terms (or groups of terms) are alias terms by selecting two or more boxes associated with the terms, and by interacting with input mechanism 840 (e.g., a "Merge Selected Terms" button). Additionally, or alternatively, a user may indicate that two terms (or two or more terms in a group of terms) are not alias terms by selecting a box associated with the terms, and by interacting with input mechanism 845 (e.g., an "Unmerge Selected Terms" button).

Once the user has finished indicating whether terms are alias terms or not, the user may interact with input mechanism 850 (e.g., a "Create Glossary" button) to create a glossary based on the user indications. For example, terms associated with a single row (e.g., terms associated with merged cells) may be added to the glossary as alias terms, and terms associated with different rows may not be added to the glossary as alias terms. Client device 210 may use the glossary to replace alias terms in the text, as described elsewhere herein.

Implementations described herein may eliminate confusion resulting from the inconsistent use of terms in a document, where multiple alias terms are used to refer to a single entity. Systems and/or methods, described herein, may determine alias terms in the document that refer to the same entity, and may replace inconsistent alias terms with a consistent alias term.

The foregoing disclosure provides illustration and description, but is not intended to be exhaustive or to limit the implementations to the precise form disclosed. Modifications and variations are possible in light of the above disclosure or may be acquired from practice of the implementations.

As used herein, component is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to standard configuration, a specific configuration based on a type of device on which the user interfaces are displayed, or a set of configurations based on capabilities and/or specifications associated with a device on which the user interfaces are displayed. The user interface may provide one or more input mechanisms for a user to provide input. The input mechanisms may include any input mechanism, such as a button, a menu item, a link, a check box, a list box, a text box, etc.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
analyzing, by a device, first text to identify a pair of terms, within the first text, that are alias terms,
the analyzing the first text including performing two or more of:
a latent semantic analysis of the pair of terms, based on the pair of terms being associated with a particular tag;
a tag-based analysis that determines that the pair of terms are associated with compatible tags;

a transitive analysis that determines that a pair of neighbor terms, associated with the pair of terms, are associated with compatible tags; or
a co-location analysis based on a distance between the pair of terms in the first text; and
the analyzing the first text further including performing one or more of:
a misspelling analysis to determine that a first term, of the pair of terms, is a misspelling of a second term, of the pair of terms,
a short form analysis to determine that the first term is a short form of the second term, or
an explicit alias analysis to determine that the first term is an explicit alias of the second term;
calculating, by the device and based on analyzing the first text, a first alias score for the pair of terms;
calculating, by the device and using the first alias score for the pair of terms, a second alias score for the pair of terms;
determining, by the device, that the second alias score satisfies a threshold;
generating, by the device and based on determining that the second alias score satisfies the threshold, a glossary that includes the pair of terms identified as alias terms,
the glossary being generated based on the performing the one or more of the misspelling analysis, the short form analysis, or the explicit alias analysis; and
replacing terms, by the device and using the glossary, within at least one of:
the first text, or
a second text that is different from the first text.

2. The method of claim 1, where analyzing the first text comprises:
performing a glossary analysis of the pair of terms based on information that identifies synonyms associated with the pair of terms; and
where generating the glossary comprises:
generating the glossary based on performing the glossary analysis.

3. The method of claim 1, where the second alias score is an overall alias score for the pair of terms.

4. The method of claim 1, further comprising:
designating one term, of the pair of terms, as a primary alias term based on at least one of:
user input, or
a characteristic of the pair of terms; and
designating another term, of the pair of terms, as a non-primary alias term; and
where replacing terms comprises:
replacing the non-primary alias term with the primary alias term.

5. The method of claim 1, further comprising:
receiving user input that identifies the first text, where the first text includes at least one of:
a document,
a plurality of documents, or
a portion of a document;
obtaining the first text, based on receiving the user input; and
where analyzing the first text comprises:
analyzing the first text based on obtaining the first text.

6. The method of claim 1, further comprising:
determining that each of the pair of terms includes a noun; and
where analyzing the first text comprises:
analyzing the first text based on determining that each of the pair of terms includes a noun.

7. The method of claim 1, where analyzing the first text includes performing the latent semantic analysis and the tag-based analysis.

8. The method of claim 1, where analyzing the first text includes performing the latent semantic analysis, the tag-based analysis, and the transitive analysis.

9. The method of claim 1, where analyzing the first text includes performing the latent semantic analysis, the tag-based analysis, the transitive analysis, and the co-location analysis.

10. The method of claim 1, where analyzing the first text includes performing the latent semantic analysis and the co-location analysis.

11. The method of claim 1, where analyzing the first text includes performing the latent semantic analysis, the tag-based analysis, and the co-location analysis.

12. The method of claim 1, where analyzing the first text includes performing the tag-based analysis and the co-location analysis.

13. A device comprising:
one or more processors to:
perform an alias analysis of first text to identify a pair of terms, within the first text, that are alias terms,
the alias analysis including at least two of:
a latent semantic analysis of a plurality of terms in the first text, the plurality of terms including the pair of terms;
a tag-based analysis, of the pair of terms, that determines that the pair of terms are associated with compatible tags;
a transitive analysis, of the pair of terms, that determines that a pair of neighbor terms, associated with the pair of terms, are associated with compatible tags; or
a co-location analysis, of the pair of terms, based on a distance between the pair of terms in the first text; and
the alias analysis further including one or more of:
a misspelling analysis to determine that a first term, of the pair of terms, is a misspelling of a second term of the pair of terms,
a short form analysis to determine that the first term is a short form of the second term, or
an explicit alias analysis to determine that the first term is an explicit alias of the second term;
calculate, based on performing the alias analysis of the first text, a first alias score for the pair of terms;
calculate, using the first alias score for the pair of terms, a second alias score for the pair of terms;
determine that the second alias score satisfies a threshold;
generate, based on determining that the second alias score satisfies the threshold, a glossary that includes the pair of terms and an indication that the pair of terms are alias terms,
the glossary being generated based on the performing the one or more of the misspelling analysis, the short form analysis, or the explicit alias analysis; and
replace, within the first text or a second text, a first alias term, of the pair of terms included in the glossary, with a second alias term, of the pair of terms included in the glossary.

14. The device of claim 13, where the one or more processors, when performing the alias analysis, are to:

perform a glossary analysis, of the pair of terms, based on information that identifies synonyms associated with the pair of terms; and
where the one or more processors, when generating the glossary, are to:
generate the glossary based on performing the glossary analysis.

15. The device of claim 13, where
the second alias score is an overall alias score for the pair of terms.

16. The device of claim 13, where the one or more processors are further to:
designate the second alias term as a primary alias term, based on at least one of:
user input, or
a characteristic of the first alias term or the second alias term; and
where the one or more processors, when replacing the first alias term with the second alias term, are to:
replace the first alias term with the second alias term based on designating the second alias term as the primary alias term.

17. The device of claim 13, where the one or more processors are further to:
receive user input that identifies the first text, where the first text includes at least one of:
a document,
a plurality of documents, or
a portion of a document;
obtain the first text, based on receiving the user input; and
where the one or more processors, when performing the alias analysis of the first text, are to:
perform the alias analysis of the first text based on obtaining the first text.

18. The device of claim 13, where the one or more processors are further to:
determine that each of the pair of terms is at least one of:
a noun,
a set of consecutive nouns in the first text, or
associated with a particular tag; and
where the one or more processors, when performing the alias analysis, are to:
perform the alias analysis based on determining that each of the pair of terms is at least one of a noun, a set of consecutive nouns in the first text, or associated with a particular tag.

19. A non-transitory computer-readable medium storing instructions, the instructions comprising:
one or more instructions that, when executed by a processor, cause the processor to:
perform an alias analysis of text to identify a pair of terms, included in the text, that are alias terms,
the alias analysis including at least two:
a latent semantic analysis of a plurality of terms included in the text, the plurality of terms including the pair of terms;
a tag-based analysis, of the pair of terms, that determines that the pair of terms are associated with compatible tags;
a transitive analysis, of the pair of terms, that determines that a pair of neighbor terms, associated with the pair of terms, are associated with compatible tags;
a co-location analysis, of the pair of terms, based on a distance between the pair of terms in the text;
a glossary analysis, of the pair of terms, based on information that identifies synonyms associated with the pair of terms; and
the alias analysis further including at least one of:
a misspelling analysis,
a short form analysis, or
an explicit alias analysis;
calculate, based on performing the alias analysis of the text, a first alias score for the pair of terms;
calculate, using the first alias score for the pair of terms, a second alias score for the pair of terms;
determine that the second alias score satisfies a threshold;
generate, based on determining that the second alias score satisfies the threshold, a glossary that includes the pair of terms and an indication that the pair of terms are alias terms; and
provide the glossary.

20. The non-transitory computer-readable medium of claim 19, where the one or more instructions that cause the processor to provide the glossary cause the processor to at least one of:
provide, via a user interface, information that identifies the pair of terms and the indication that the pair of terms are alias terms;
replace, within the text, a first alias term, of the pair of terms included in the glossary, with a second alias term, of the pair of terms included in the glossary; or
replace, within a different text, the first alias term with the second alias term.

21. The non-transitory computer-readable medium of claim 19, where the
second alias score is an overall alias score for the pair of terms.

22. The non-transitory computer-readable medium of claim 19, where the one or more instructions further cause the processor to:
designate a first term, of the pair of terms, as a primary alias term, based on at least one of:
user input, or
a characteristic associated with the first term; and
where the one or more instructions that cause the processor to provide the glossary cause the processor to:
replace a second term, of the pair of terms, with the first term, based on designating the first term as the primary alias term.

23. The non-transitory computer-readable medium of claim 19, where the one or more instructions further cause the processor to:
receive user input that identifies the text, where the text includes at least one of:
a document,
a plurality of documents, or
a portion of a document;
obtain the text, based on receiving the user input; and
where the one or more instructions that cause the processor to perform the alias analysis of the text cause the processor to:
perform the alias analysis of the text based on obtaining the text.

24. The non-transitory computer-readable medium of claim 19, where the one or more instructions cause the processor to:
determine that each of the pair of terms is at least one of:
a noun,
a set of consecutive nouns in the text, or
associated with a particular tag; and where the one or more instructions that cause the processor to perform the alias analysis cause the processor to:
perform the alias analysis based on determining that each of the pair of terms is at least one of a noun, a set of consecutive nouns in the text, or associated with a particular tag.

25. The method of claim 1, where the first alias score includes at least one of:
   a latent semantic similarity score resulting from the latent semantic analysis;
   a tag-based similarity score resulting from the tag-based analysis;
   a transitive similarity score resulting from the transitive analysis;
   a co-location similarity score resulting from the co-location analysis;
   a misspelling similarity score resulting from the misspelling analysis;
   a short form similarity score resulting from the short form analysis; or
   an explicit similarity score resulting from the explicit alias analysis.

26. The device of claim 13, where the first alias score includes at least one of:
   a latent semantic similarity score resulting from the latent semantic analysis;
   a tag-based similarity score resulting from the tag-based analysis;
   a transitive similarity score resulting from the transitive analysis;
   a co-location similarity score resulting from the co-location analysis;
   a misspelling similarity score resulting from the misspelling analysis;
   a short form similarity score resulting from the short form analysis; or
   an explicit similarity score resulting from the explicit alias analysis.

* * * * *

UNITED STATES PATENT AND TRADEMARK OFFICE
CERTIFICATE OF CORRECTION

PATENT NO. : 9,245,015 B2  
APPLICATION NO. : 13/790864  
DATED : January 26, 2016  
INVENTOR(S) : Janardan Misra et al.

Page 1 of 1

It is certified that error appears in the above-identified patent and that said Letters Patent is hereby corrected as shown below:

In the Claims

Please correct Claim 19 as follows:

Column 33, line 55, after "least two" insert -- of --.

Signed and Sealed this
Twenty-fourth Day of May, 2016

Michelle K. Lee
*Director of the United States Patent and Trademark Office*